(12) United States Patent
Zhang et al.

(10) Patent No.: US 11,553,425 B2
(45) Date of Patent: Jan. 10, 2023

(54) WAKEUP SIGNAL FOR NEW RADIO MULTICAST COMMUNICATIONS

(71) Applicant: QUALCOMM Incorporated, San Diego, CA (US)

(72) Inventors: Xiaoxia Zhang, San Diego, CA (US); Jing Sun, San Diego, CA (US); Alberto Rico Alvarino, San Diego, CA (US); Le Liu, Fremont, CA (US); Peter Gaal, San Diego, CA (US); Xipeng Zhu, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 14 days.

(21) Appl. No.: 17/090,721

(22) Filed: Nov. 5, 2020

(65) Prior Publication Data

US 2021/0144639 A1    May 13, 2021

Related U.S. Application Data

(60) Provisional application No. 62/931,985, filed on Nov. 7, 2019.

(51) Int. Cl.
*H04W 52/02* (2009.01)

(52) U.S. Cl.
CPC ... *H04W 52/0229* (2013.01); *H04W 52/0216* (2013.01); *H04W 52/0219* (2013.01)

(58) Field of Classification Search
None
See application file for complete search history.

(56) References Cited

U.S. PATENT DOCUMENTS

| | | | |
|---|---|---|---|
| 2017/0201964 A1* | 7/2017 | Gupta | H04W 48/20 |
| 2018/0097598 A1* | 4/2018 | Ang | H04W 52/0216 |
| 2018/0098287 A1 | 4/2018 | Ang et al. | |
| 2018/0132292 A1* | 5/2018 | Yang | H04W 76/18 |
| 2018/0206289 A1 | 7/2018 | Kim et al. | |

OTHER PUBLICATIONS

International Search Report and Written Opinion—PCT/US2020/059335—ISA/EPO—dated Feb. 24, 2021.

\* cited by examiner

*Primary Examiner* — Hong Shao
(74) *Attorney, Agent, or Firm* — Holland & Hart LLP

(57) ABSTRACT

Methods, systems, and devices for wireless communications are described. A communication device, such as a user equipment (UE) may monitor a pre-wakeup window during an inactive duration of a multicast discontinuous reception (DRX) cycle that includes multiple active durations and multiple inactive durations. The UE may receive, in the pre-wakeup window, a wakeup signal that indicates a quantity of the active durations in the multicast DRX cycle that the UE is to monitor and the UE may monitor the indicated quantity of active durations for multicast signals for the UE.

30 Claims, 18 Drawing Sheets

WAKEUP SIGNAL FOR NEW RADIO MULTICAST COMMUNICATIONS

CROSS REFERENCE

The present Application for Patent claims the benefit of U.S. Provisional Patent Application No. 62/931,985 by ZHANG et al., entitled "WAKEUP SIGNAL FOR NEW RADIO MULTICAST COMMUNICATIONS," filed Nov. 7, 2019, assigned to the assignee hereof, and expressly incorporated by reference herein.

TECHNICAL FIELD

The following relates generally to wireless communications and more specifically to wakeup signals for new radio (NR) multicast communications.

DESCRIPTION OF THE RELATED TECHNOLOGY

Wireless communications systems are widely deployed to provide various types of communication content such as voice, video, packet data, messaging, broadcast, and so on. These systems may be capable of supporting communication with multiple users by sharing the available system resources (for example, time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as NR systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM).

A wireless multiple-access communications system may include a number of base stations or network access nodes, each simultaneously supporting communication for multiple communication devices which may be otherwise known as user equipments (UEs). Some wireless communications systems, such as 4G systems and 5G systems, may support discontinuous reception (DRX) operations for single cell-point to multipoint (SC-PTM) communications and unicast communications. Some wireless communications systems, such as 4G systems, may also support DRX operations for multicast communications. As demand for communication efficiency increases, some wireless communications systems, such as 5G systems, may fail to provide satisfactory DRX operations for multicast communications, and thereby may be unable to support high reliability and low latency multicast operations, among other examples.

SUMMARY

The described techniques may relate to configuring a communication device, which may be a user equipment (UE), to support discontinuous reception (DRX) operations for multicast communications in fifth generation (5G) systems, which may be referred to as New Radio (NR) systems. In some examples, the described techniques may be used to configure the communication device to support DRX operations for unicast communications as well as multicast communications in 5G systems. The described techniques may be used to configure the communication device to monitor a pre-wakeup window over an inactive duration of a multicast DRX cycle, and the communication device may receive a wakeup signal in the pre-wakeup window. The wakeup signal may carry an indication of a number of active durations of the multicast DRX cycle. The communication device may receive multicast communications over the number of active durations of the multicast DRX cycle.

The described techniques may be used to configure the communication device to support alignment of active durations associated with unicast communications with active durations associated with multicast communications. In some examples, the described techniques may be used to configure the communication device to support a pre-wakeup window associated with unicast communications to be within (or neighboring) an active duration of a multicast DRX cycle. Alternatively, the described techniques may be used to configure the communication device to support a pre-wakeup window associated with multicast communications to be within (or neighboring) an active duration of a unicast DRX cycle. The described techniques may also be used to configure the communication device to support overlap between pre-wakeup windows for both unicast communications and multicast communications. The communication device may be configured to support wakeup signaling that may carry an indication of a number of active durations of a multicast DRX cycle or a number of active durations of a unicast DRX cycle, or both. Based on such techniques, the communication device may be configured to support DRX operations for multicast communications in 5G systems. The described techniques may include features for improvements to power consumption, spectral efficiency, higher data rates and, in some examples, may promote enhanced efficiency for high reliability and low latency multicast operations in 5G systems, among other benefits.

One innovative aspect of the subject matter described in this disclosure can be implemented in a method for wireless communications at a UE. The method includes monitoring a pre-wakeup window during an inactive duration of a multicast DRX cycle that includes a set of inactive durations and a set of active durations, receiving, in the pre-wakeup window, a wakeup signal that indicates a quantity of active durations in the set of active durations of the multicast DRX cycle for the UE, and monitoring the indicated quantity of active durations of the set of active durations for multicast signals for the UE during the set of active durations of the multicast DRX cycle.

Another innovative aspect of the subject matter described in this disclosure can be implemented in an apparatus for wireless communications at a UE. The apparatus includes a processor, memory coupled with the processor, and instructions stored in the memory. The instructions may be executable by the processor to cause the apparatus to monitor a pre-wakeup window during an inactive duration of a multicast DRX cycle that includes a set of inactive durations and a set of active durations, receive, in the pre-wakeup window, a wakeup signal that indicates a quantity of active durations in the set of active durations of the multicast DRX cycle for the apparatus, and monitor the indicated quantity of active durations of the set of active durations for multicast signals for the UE during the set of active durations of the multicast DRX cycle.

Another innovative aspect of the subject matter described in this disclosure can be implemented in an apparatus for wireless communications at a UE. The apparatus includes means for monitoring a pre-wakeup window during an inactive duration of a multicast DRX cycle that includes a set of inactive durations and a set of active durations, receiving, in the pre-wakeup window, a wakeup signal that indicates a quantity of active durations in the set of active durations of the multicast DRX cycle for the apparatus, and monitoring the indicated quantity of active durations of the set of active durations for multicast signals for the UE during the set of active durations of the multicast DRX cycle.

Another innovative aspect of the subject matter described in this disclosure can be implemented in non-transitory computer-readable medium storing code for wireless communications at a UE. The code includes instructions executable by a processor to monitor a pre-wakeup window during an inactive duration of a multicast DRX cycle that includes a set of inactive durations and a set of active durations, receive, in the pre-wakeup window, a wakeup signal that indicates a quantity of active durations in the set of active durations of the multicast DRX cycle for the UE, and monitor the indicated quantity of active durations of the set of active durations for multicast signals for the UE during the set of active durations of the multicast DRX cycle.

Some examples of the method, apparatuses, and non-transitory computer-readable medium described herein may further include operations, features, means, or instructions for monitoring the pre-wakeup window may be based on the configuration.

In some examples of the method, apparatuses, and non-transitory computer-readable medium described herein, the configuration includes a radio resource control (RRC) configuration.

In some examples of the method, apparatuses, and non-transitory computer-readable medium described herein, the set of active durations of the multicast DRX cycle may be for a multicast service that corresponds to a group radio network temporary identifier (G-RNTI).

Some examples of the method, apparatuses, and non-transitory computer-readable medium described herein may further include operations, features, means, or instructions for monitoring a second pre-wakeup window during an inactive duration of a unicast DRX cycle that includes a set of inactive durations and a set of active durations, receiving, in the second pre-wakeup window, a second wakeup signal that indicates a quantity of active durations in the set of active durations of the unicast DRX cycle for the UE, and monitoring the indicated quantity of active durations of the set of active durations for unicast signals for the UE during the unicast DRX cycle.

Some examples of the method, apparatuses, and non-transitory computer-readable medium described herein may further include operations, features, means, or instructions for monitoring the second pre-wakeup window may be based on the configuration.

One innovative aspect of the subject matter described in this disclosure can be implemented in a method for wireless communications at a base station. The method includes determining a pre-wakeup window during an inactive duration of a multicast DRX cycle that includes a set of inactive durations and a set of active durations, transmitting, in the pre-wakeup window, a wakeup signal that indicates a quantity of active durations in the set of active durations of the multicast DRX cycle for a UE, and transmitting one or more multicast signals in the indicated quantity of active durations of the set of active durations of the multicast DRX cycle.

Another innovative aspect of the subject matter described in this disclosure can be implemented in an apparatus for wireless communications at a base station. The apparatus includes a processor, memory coupled with the processor, and instructions stored in the memory. The instructions may be executable by the processor to cause the apparatus to determine a pre-wakeup window during an inactive duration of a multicast DRX cycle that includes a set of inactive durations and a set of active durations, transmit, in the pre-wakeup window, a wakeup signal that indicates a quantity of active durations in the set of active durations of the multicast DRX cycle for a UE, and transmit one or more multicast signals in the indicated quantity of active durations of the set of active durations of the multicast DRX cycle.

Another innovative aspect of the subject matter described in this disclosure can be implemented in an apparatus for wireless communications at a base station. The apparatus includes means for determining a pre-wakeup window during an inactive duration of a multicast DRX cycle that includes a set of inactive durations and a set of active durations, transmitting, in the pre-wakeup window, a wakeup signal that indicates a quantity of active durations in the set of active durations of the multicast DRX cycle for a UE, and transmitting one or more multicast signals in the indicated quantity of active durations of the set of active durations of the multicast DRX cycle.

Another innovative aspect of the subject matter described in this disclosure can be implemented in non-transitory computer-readable medium storing code for wireless communication at base station. The code includes instructions executable by a processor to determine a pre-wakeup window during an inactive duration of a multicast DRX cycle that includes a set of inactive durations and a set of active durations, transmit, in the pre-wakeup window, a wakeup signal that indicates a quantity of active durations in the set of active durations of the multicast DRX cycle for a UE, and transmit one or more multicast signals in the indicated quantity of active durations of the set of active durations of the multicast DRX cycle.

Some examples of the method, apparatuses, and non-transitory computer-readable medium described herein may further include operations, features, means, or instructions for monitoring the pre-wakeup window may be based on the configuration.

In some examples of the method, apparatuses, and non-transitory computer-readable medium described herein, the configuration includes an RRC configuration.

In some examples of the method, apparatuses, and non-transitory computer-readable medium described herein, the set of active durations of the multicast DRX cycle may be for a multicast service that corresponds to a G-RNTI.

Some examples of the method, apparatuses, and non-transitory computer-readable medium described herein may further include operations, features, means, or instructions for determining a second pre-wakeup window during an inactive duration of a unicast DRX cycle that includes a set of inactive durations and a set of active durations, transmitting, in the second pre-wakeup window, a second wakeup signal that indicates a quantity of active durations in the set of active durations of the unicast DRX cycle for the UE, and transmitting, based on the second wakeup signal, unicast signals for the UE during the set of active durations of the unicast DRX cycle.

Some examples of the method, apparatuses, and non-transitory computer-readable medium described herein may further include operations, features, means, or instructions for transmitting a message including a configuration of the second pre-wakeup window associated with the unicast signals, where monitoring the second pre-wakeup window may be based on the configuration.

DETAILED DESCRIPTION

Figure 1:
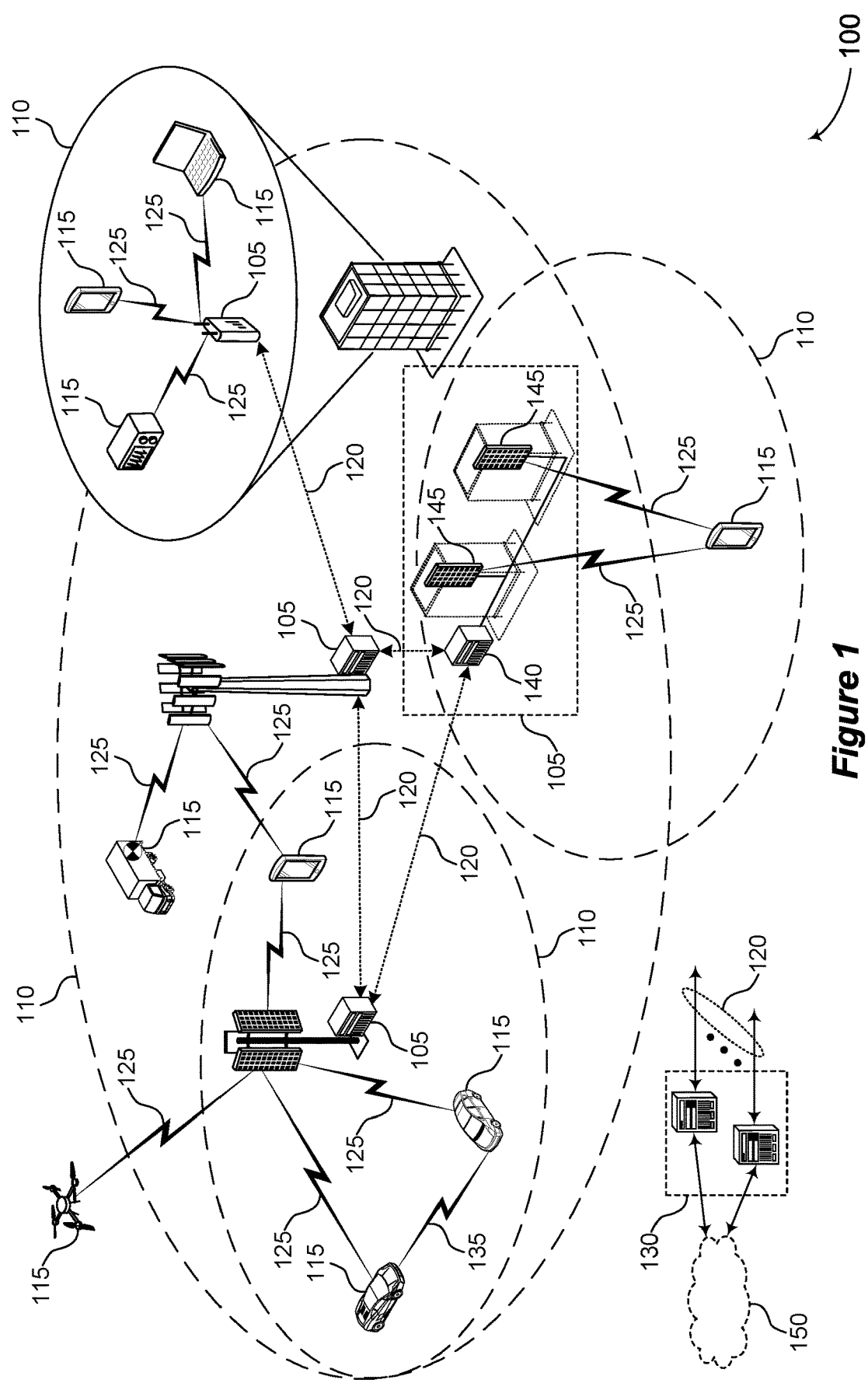
FIGS. 1 and 2 illustrate examples of wireless communications systems that support wakeup signals for new radio (NR) multicast communications in accordance with aspects of the present disclosure.

Some wireless communication systems may include communication devices, such as user equipments (UEs) and base stations, for example, next-generation NodeBs or giga-NodeBs (either of which may be referred to as a gNB) that may support multiple radio access technologies including fourth generation (4G) systems such as Long Term Evolution (LTE) systems and fifth generation (5G) systems which may be referred to as New Radio (NR) systems. In some cases, some wireless communications systems, such as 4G systems and 5G systems, may support discontinuous reception (DRX) operations for unicast communications, which may relate to a unicast service. A unicast service may include a point-to-point communication scheme in which information (for example, in the form of packets) is transmitted from a single source (for example, a base station) to a single destination (for example, a UE). Some wireless communications systems, such as 4G systems, may also support DRX operations for multicast communications, which may relate to a multicast service. A multicast service may include a point-to-multipoint communication scheme in which information (for example, in the form of packets) is transmitted simultaneously from a single source (for example, a base station) to multiple destinations (for example, multiple UEs). Additionally, a multicast service may refer to a distribution of information among a specific group of communication devices (for example, a group of UEs) that are subscribed to the multicast service. As demand for communication efficiency increases, some wireless communications systems, such as 5G systems, may fail to provide suitable DRX operations for multicast communications, and thereby may be unable to support high reliability and low latency multicast operations.

The communication devices may be configured to support DRX operations for multicast communications in 5G systems. The communication devices may monitor a pre-wakeup window over an inactive duration of a multicast DRX cycle, and the communication devices may receive a wakeup signal in the pre-wakeup window. The wakeup signal may carry an indication of a number (for example, a count or quantity) of active durations (also referred to as DRX ON durations) of the multicast DRX cycle. As such, the communication devices may awake in an active duration of the multicast DRX cycle indicated by the wakeup signal received in the pre-wakeup window, and may avoid monitoring any active durations not indicated in the wakeup signal. The communication devices may receive multicast communications over the number of active durations of the multicast DRX cycle indicated in the wakeup signal.

The described techniques may be used to configure the communication device to support DRX operations for unicast communications and multicast communications in 5G systems. In some aspects, the communication devices may support alignment of active durations associated with unicast communications with active durations associated with multicast communications. In some examples, the communication devices may support a pre-wakeup window associated with unicast communications to be part of (or neighboring) an active duration of a multicast DRX cycle. Alternatively, the communication devices may support a pre-wakeup window associated with multicast communications to be part of (or neighboring) an active duration of a unicast DRX cycle. The communication devices may, additionally or alternatively, support overlap between pre-wakeup windows for both unicast communications and multicast communications. The communication device may, in some examples, be configured to support wakeup signaling that may carry an indication of a number of active durations of a multicast DRX cycle or a number of active durations of a unicast DRX cycle, or both.

Particular aspects of the subject matter described in this disclosure may be implemented to realize one or more of the following potential advantages. For example, operations performed by the described communication devices may provide improvements to multicast communications in 5G or other systems. In some examples, configuring the described communication devices for multicast operations that support a pre-wakeup window, a wakeup signal, or an active duration of a multicast DRX cycle may improve power consumption and spectral efficiency. For example, by configuring a pre-wakeup window or an active duration of a multicast DRX cycle, communication devices may experience reduced power consumption as communication devices may reduce an active duration (for example, an awake duration). Such improvements may allow for higher data rates and enhanced efficiency for multicast operations, among other benefits.

Aspects of the disclosure are initially described in the context of wireless communications systems. Aspects of the disclosure are then illustrated by and described with reference to timelines that relate to wakeup signals for NR multicast communications. Aspects of the disclosure are further illustrated by and described with reference to apparatus diagrams, system diagrams, and flowcharts that relate to wakeup signals for NR multicast communications.

FIG. 1 illustrates an example of a wireless communications system 100 that supports wakeup signal for NR multicast communications in accordance with aspects of the present disclosure. The wireless communications system 100 may include one or more base stations 105, one or more UEs 115, and a core network 130. In some examples, the wireless communications system 100 may be an LTE network, an LTE-Advanced (LTE-A) network, an LTE-A Pro network, or an NR network. In some examples, the wireless communications system 100 may support enhanced broadband communications, ultra-reliable (for example, mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (for example, core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (for example, via an S1, N2, N3, or other interface). The base stations 105 may communicate with one another over the backhaul links 120 (for example, via an X2, Xn, or other interface) either directly (for example, directly between base stations 105), or indirectly (for example, via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples. The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (for example, a bandwidth part (BWP)) that is operated according to one or more physical layer channels for a given radio access technology (for example, LTE, LTE-A, LTE-A Pro, NR). Each physical layer channel may carry acquisition signaling (for example, synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (for example, in a carrier aggregation configuration), a carrier may also have acquisition signaling or control signaling that coordinates operations for other carriers. A carrier may be associated with a frequency channel (for example, an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (for example, of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (for example, in an FDD mode) or may be configured to carry downlink and uplink communications (for example, in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (for example, 1.4, 3, 5, 10, 15, 20, 40, or 80 megahertz (MHz)). Devices of the wireless communications system 100 (for example, the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (for example, a sub-band, a BWP) or all of a carrier bandwidth.

Signal waveforms transmitted over a carrier may be made up of multiple subcarriers (for example, using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol duration (for example, a duration of one modulation symbol) and one subcarrier, in some examples, the symbol duration and subcarrier spacing are inversely related. The number of bits carried by each resource element may depend on the modulation scheme (for example, the order of the modulation scheme, the coding rate of the modulation scheme, or both). The more resource elements that a UE 115 receives and the higher the order of the modulation scheme, the higher the data rate may be for the UE 115. A wireless communications resource may refer to a combination of a radio frequency spectrum resource, a time resource, and a spatial resource (for example, spatial layers or beams), and the use of multiple spatial layers may further increase the data rate or data integrity for communications with a UE 115.

One or more numerologies for a carrier may be supported, in some examples, a numerology may include a subcarrier spacing (Δf) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling duration of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (for example, 10 milliseconds (ms)). Each radio frame may be identified by a system frame number (SFN) (for example, ranging from 0 to 1023).

Each frame may include multiple consecutively numbered subframes or slots, and each subframe or slot may have the same duration. In some examples, a frame may be divided (for example, in the time domain) into subframes, and each subframe may be further divided into a number of slots. Alternatively, each frame may include a variable number of slots, and the number of slots may depend on subcarrier spacing. Each slot may include a number of symbol durations (for example, depending on the length of the cyclic prefix prepended to each symbol). In some wireless communications systems 100, a slot may further be divided into multiple mini-slots containing one or more symbols. Excluding the cyclic prefix, each symbol duration may contain one or more (for example, $N_f$) sampling durations. The duration of a symbol duration may depend on the subcarrier spacing or frequency band of operation.

A subframe, a slot, a mini-slot, or a symbol may be the smallest scheduling unit (for example, in the time domain) of the wireless communications system 100 and may be referred to as a transmission time interval (TTI). In some examples, the TTI duration (for example, the number of symbol durations in a TTI) may be variable. Additionally or alternatively, the smallest scheduling unit of the wireless communications system 100 may be dynamically selected (for example, in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (for example, a control resource set (CORESET)) for a physical control channel may be defined by a number of symbol durations and may extend across the system bandwidth or a subset of the system bandwidth of the carrier. One or more control regions (for example, CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (for example, control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (for example, over a carrier) and may be associated with an identifier for distinguishing neighboring cells (for example, a physical cell identifier (PCID), a virtual cell identifier (VCID), or others). In some examples, a cell may also refer to a geographic coverage area 110 or a portion of a geographic coverage area 110 (for example, a sector) over which the logical communication entity operates. Such cells may range from smaller areas (for example, a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (for example, several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (for example, licensed, unlicensed) frequency bands as macro cells. Small cells may provide unrestricted access to the UEs 115 with service subscriptions with the network provider or may provide restricted access to the UEs 115 having an association with the small cell (for example, the UEs 115 in a closed subscriber group (CSG), the UEs 115 associated with users in a home or office). A base station 105 may support one or multiple cells and may also support communications over the one or more cells using one or multiple component carriers. In some examples, a carrier may support multiple cells, and different cells may be configured according to different protocol types (for example, MTC, narrowband IoT (NB-IoT), enhanced mobile broadband (eMBB)) that may provide access for different types of devices.

In some examples, a base station 105 may be movable and provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (for example, via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (for example, a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (for example, according to narrowband communications), or a combination of these techniques. For example, some UEs 115 may be configured for operation using a narrowband protocol type that is associated with a defined portion or range (for example, set of subcarriers or resource blocks (RBs)) within a carrier, within a guard-band of a carrier, or outside of a carrier.

The wireless communications system 100 may be configured to support ultra-reliable communications or low-latency communications, or various combinations thereof For example, the wireless communications system 100 may be configured to support ultra-reliable low-latency communications (URLLC) or mission critical communications. The UEs 115 may be designed to support ultra-reliable, low-latency, or critical functions (for example, mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (for example, using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (for example, UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (for example, base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (for example, a mobility management entity (MME), an access and mobility management function (AMF)) and at least one user plane entity that routes packets or interconnects to external networks (for example, a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (for example, radio heads and ANCs) or consolidated into a single network device (for example, a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (for example, less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (for example, from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (for example, LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (for example, the same codeword) or different data streams (for example, different codewords). Different spatial layers may be associated with different antenna ports used for channel measurement and reporting. MIMO techniques include single-user MIMO (SU-MIMO). In some examples, multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (for example, a base station 105, a UE 115) to shape or steer an antenna beam (for example, a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (for example, with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (for example, antenna panels) to conduct beamforming operations for directional communications with a UE 115. Some signals (for example, synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (for example, by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (for example, a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (for example, by a base station 105 or a UE 115) may be performed using multiple beam directions, and the device may use a combination of digital precoding or radio frequency beamforming to generate a combined beam for transmission (for example, from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (for example, a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (for example, a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (for example, for identifying a beam direction for subsequent transmission or reception by the UE 115) or for transmitting a signal in a single direction (for example, for transmitting data to a receiving device).

A receiving device (for example, a UE 115) may try multiple receive configurations (for example, directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (for example, different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (for example, when receiving a data signal). The single receive configuration may be aligned in a beam direction determined based on listening according to different receive configuration directions (for example, a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (for example, using a cyclic redundancy check (CRC)), forward error correction (FEC), and retransmission (for example, automatic repeat request (ARQ)). HARQ may improve throughput at the MAC layer in poor radio conditions (for example, low signal-to-noise conditions). In some examples, a device may support same-slot HARQ feedback. The device may provide HARQ feedback in a specific slot for data received in a previous symbol in the slot. In other cases, the device may provide HARQ feedback in a subsequent slot, or according to some other time interval.

Figure 2:
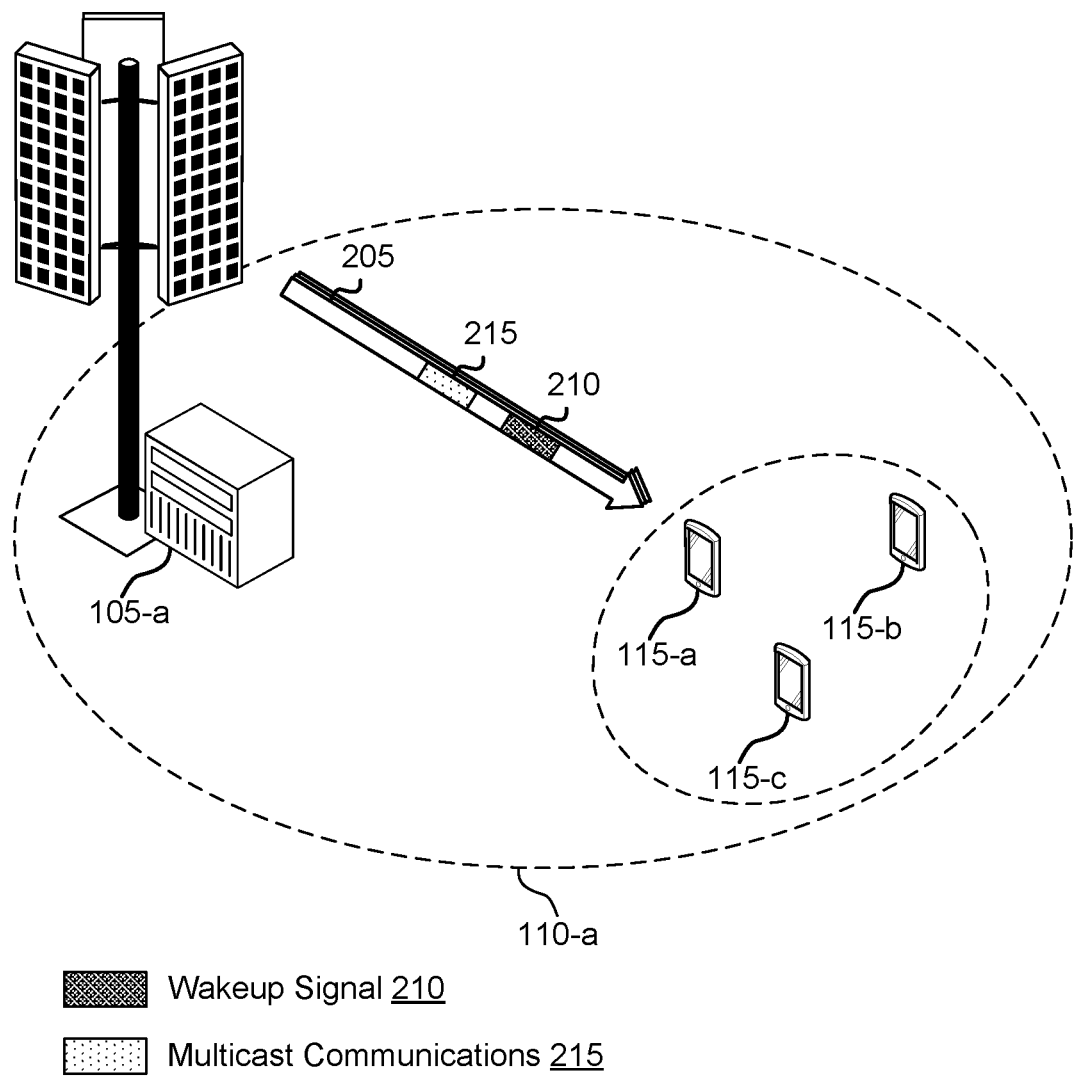

FIG. 2 illustrates an example of a wireless communications system 200 that supports wakeup signals for NR multicast communications in accordance with aspects of the present disclosure. In some examples, the wireless communications system 200 may implement aspects of the wireless communications system 100. For example, the wireless communications system 200 may include a base station 105-a and one or more UEs 115, for example a UE 115-a, a UE 115-b, and a UE 115-c, within a geographic coverage area 110-a. The base station 105-a, the UE 115-a, the UE 115-b, and the UE 115-c may be examples of the corresponding devices described with reference to FIG. 1. In some examples, the wireless communications system 200 may support multiple radio access technologies including 4G systems such as LTE systems, LTE-A systems, or LTE-A Pro systems, and 5G systems which may be referred to as NR systems. The wireless communications system 200 may, in some examples, be a multimedia broadcast multicast service (MBMS) network or a multimedia broadcast multicast service (MBMS) single frequency network (MBSFN). The wireless communications system 200 may support improvements to power consumption, spectral efficiency, higher data rates and, in some examples, may promote enhanced efficiency for high reliability and low latency multicast operations, among other benefits.

One or more of the UE 115-a, the UE 115-b, and the UE 115-c in the wireless communications system 200 may support unicast communications for a unicast service. The unicast service may include a point-to-point communication scheme in which information (for example, in the form of packets) is transmitted from a single source (for example, the base station 105-a) to a single destination (for example, the UE 115-a). Additionally or alternatively, one or more of the UE 115-a, the UE 115-b, and the UE 115-c in the wireless communications system 200 may support multicast communications, which may relate to a multicast service. The multicast service may include a point-to-multipoint communication scheme in which information (for example, in the form of packets) is transmitted simultaneously from a single source (for example, the base station 105-a) to multiple destinations (for example, one or more of the UE 115-a, the UE 115-b, and the UE 115-c). Additionally, a multicast service may refer to a distribution of information among a specific group of communication devices (for example, a group of UEs) that are subscribed to the multicast service. For example, one or more of the UE 115-a, the UE 115-b, and the UE 115-c may form a group of UEs that are subscribed to the multicast service.

In some examples, one or more of the UE 115-a, the UE 115-b, and the UE 115-c may support various RRC modes to preserve resources (for example, time and frequency resources of the wireless communications system 200), a battery life of one or more of the UE 115-a, the UE 115-b, and the UE 115-c, among other examples. An RRC mode may include one or more of an RRC connected mode, an RRC idle mode, or an RRC inactive mode. In the RRC connected mode, one or more of the UE 115-a, the UE 115-b, and the UE 115-c may have an active connection with the base station 105-a. The base station 105-a may, in some examples, configure one or more of the UE 115-a, the UE 115-b, and the UE 115-c with a pre-wakeup window to preserve resources (for example, time and frequency resources of the wireless communications system 200).

The base station 105-a may configure one or more of the UE 115-a, the UE 115-b, and the UE 115-c by transmitting a configuration message via one or more directional beams 205 (for example, downlink directional beams). The configuration message may include a configuration of a pre-wakeup window associated with unicast communications (also referred to as unicast signals) or multicast communications (also referred to as multicast signals), or both. In some examples, the configuration message may be an RRC configuration message. While in the RRC connected mode, one or more of the UE 115-a, the UE 115-b, and the UE 115-c may receive the configuration message via the one or more directional beams 205 (for example, downlink directional beams). The base station 105-a may enable one or more of the UE 115-a, the UE 115-b, and the UE 115-c to power on and monitor the pre-wakeup window over an inactive duration of a DRX cycle. The DRX cycle may in some examples, be a unicast DRX cycle or a multicast DRX cycle depending on whether communications between the base station 105-a and one or more of the UE 115-a, the UE 115-b, and the UE 115-c includes unicast communications or multicast communications, or both.

The base station 105-a may broadcast a wakeup signal 210 to one or more of the UE 115-a, the UE 115-b, and the UE 115-c via one or more directional beams 205 (for example, downlink directional beams). One or more of the UE 115-a, the UE 115-b, and the UE 115-c may receive via one or more directional beams 205 (for example, downlink directional beams), in the pre-wakeup window, the wakeup signal 210. In some examples, the wakeup signal 210 may carry an indication of a quantity of active durations of a DRX cycle (for example, a multicast DRX cycle) for one or more of the UE 115-a, the UE 115-b, and the UE 115-c. The active durations of the DRX cycle may be for a multicast service that corresponds to a group radio network temporary identifier (G-RNTI). One or more of the UE 115-a, the UE 115-b, and the UE 115-c may receive, from the base station 105-a, multicast communications 215 over the active durations of the DRX cycle (for example, the multicast DRX cycle).

Multicast communications 215 may be identified by being associated with (for example, scrambled at least in part using) a G-RNTI, and unicast communications may be identified by being associated with (for example, scrambled at least in part using) a radio network temporary identifier (RNTI) (for example, a cell-specific RNIT (C-RNTI)). RNTIs are used to differentiate or identify a connected UE in the cell, a specific radio channel, a group of UEs in case of paging or multicast, a group of UEs for which power control is issued by the eNB, system information transmitted for all the UEs by a base station. The G-RNTI may indicate a multicast communication 215 for a group of one or more UEs (for example, the UE 115-a, the UE 115-b, and the UE 115-c), while a RNTI specific to a particular UE (for example, a C-RNTI) may indicate a unicast communication for one UE (for example, a single one of UE 115-a, the UE 115-b, or the UE 115-c).

The operations performed by the base station 105-a and one or more of the UE 115-a, the UE 115-b, and the UE 115-c may provide improvements to multicast operations in the wireless communications system 200, including for multicast communications 215. Furthermore, the operations performed by the base station 105-a and one or more of the UE 115-a, the UE 115-b, and the UE 115-c may provide benefits and enhancements to the operation of the UE 115-a, the UE 115-b, and the UE 115-c. For example, by supporting DRX operations for multicast operations in 5G systems, the operational characteristics, such as power consumption may be reduced. The operations performed by the base station 105-a and one or more of the UE 115-a, the UE 115-b, and the UE 115-c may also increase efficiency at one or more of the UE 115-a, the UE 115-b, and the UE 115-c by reducing latency associated with processes related to high reliability and low latency multicast operations.

Figure 3:
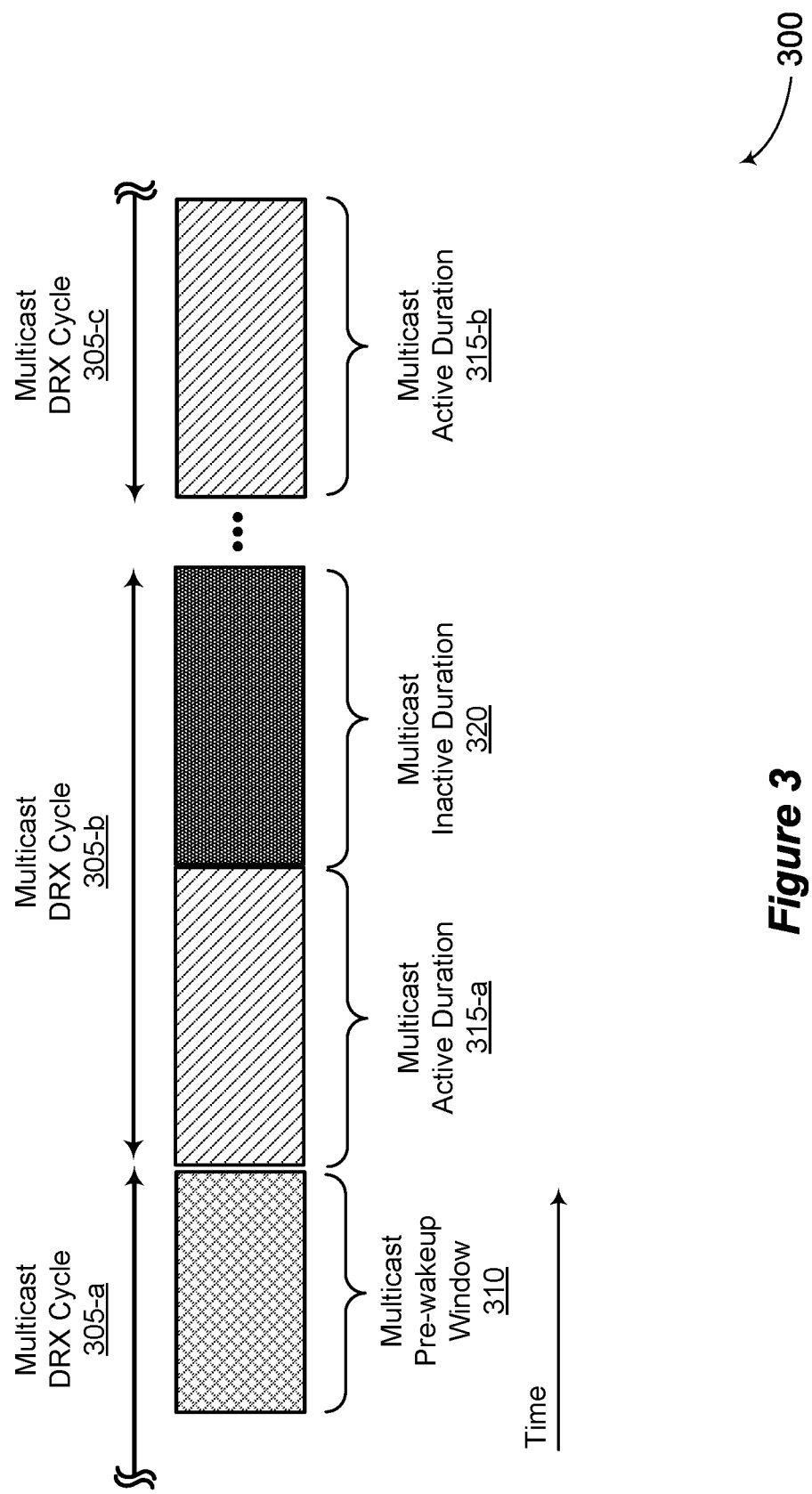
FIGS. 3-6 illustrates examples of timelines that support wakeup signals for NR multicast communications in accordance with aspects of the present disclosure.

FIG. 3 illustrates an example of a timeline 300 that supports wakeup signals for NR multicast communications in accordance with aspects of the present disclosure. In some examples, the timeline 300 may also implement aspects of the wireless communications system 100 and 200, as described with reference to FIGS. 1 and 2. For example, the timeline 300 may be based on a configuration by a base station 105 or a UE 115, and implemented by the UE 115. In the example illustrated in FIG. 3, the timeline 300 is applicable to implementations or instances when the UE 115 is configured with DRX operation capability for multicast communications in 5G systems. For example, the timeline 300 may include one or more multicast DRX cycles 305, which may correspond to time resources (for example, a symbol duration, a slot duration, a subframe duration, a frame duration), as well as frequency resources (for example, subcarriers, carriers). The timeline 300 may also include a multicast pre-wakeup window 310 and one or more multicast active durations 315 (also referred to as G-RNTI ON durations). One or more of the multicast pre-wakeup window 310 and the one or more multicast active durations 315 may also correspond to time and frequency resources. For example, the multicast pre-wakeup window 310 and the one or more multicast active durations 315 may correspond to a number of subframe cycles, with each subframe in a cycle having a subframe index ranging from 0 to 9. Each subframe cycle or subframe index or both may relate to one or more symbols and subcarriers.

With reference to FIGS. 1 and 2, and in accordance with the timeline 300, a UE 115 may monitor a multicast pre-wakeup window 310 over a multicast DRX cycle 305-a. In some examples, the multicast pre-wakeup window 310 may be part of an inactive duration of the multicast DRX cycle 305-a to preserve resources (for example, time and frequency resources) or a battery life of the UE 115. While monitoring the multicast pre-wakeup window 310 in the multicast DRX cycle 305-a, the UE 115 may receive, from a base station 105, a wakeup signal, which may carry an indication of a number of active durations (for example, one or more multicast active durations 315) of a number of subsequent multicast DRX cycles 305 for the UE 115. That is, the wakeup signal may indicate whether the UE 115 has to wake up for one or more subsequent multicast active durations 315 associated with one or more subsequent multicast DRX cycles 305. For example, the wakeup signal may provide an indication for the UE 115 to wake up in a multicast active duration 315-a associated with a multicast DRX cycle 305-b, as well as in a multicast active duration 315-b associated with a multicast DRX cycle 305-c.

In some examples, one or more of the multicast DRX cycles 305 may include a multicast inactive duration. For example, the multicast DRX cycle 305-b may include a multicast inactive duration 320 (also referred to as a multicast OFF duration). While in the multicast inactive duration 320, the UE 115 may enter a low power mode, and thereby reduce power consumption. The UE 115 may exit the low power mode in the active durations (for example, the one or more multicast active durations 315) of the one or more multicast DRX cycles 305. The active durations (for example, the one or more multicast active durations 315) of the one or more multicast DRX cycles 305 may be for a multicast service that corresponds to a G-RNTI. The UE 115 may receive, from the base station 105, multicast service-related information (for example, a multicast content, a multicast service request, among other examples) over the one or more multicast active durations 315 of the one or more multicast DRX cycles 305.

Returning to FIG. 2, in some examples, the base station 105-a may configure one or more of the UE 115-a, the UE 115-b, and the UE 115-c to support unicast communications in addition to multicast communications for added power saving advantages. In some examples, for added power saving, the base station 105-a may align one or more active durations associated with a unicast DRX cycle with one or more active durations associated with a multicast DRX cycle. In some other examples, the base station 105-a may align a unicast pre-wakeup window to an active duration of a multicast DRX cycle. In other examples, the base station 105-a may align a multicast pre-wakeup window to an active duration of a unicast DRX cycle.

Figure 4:
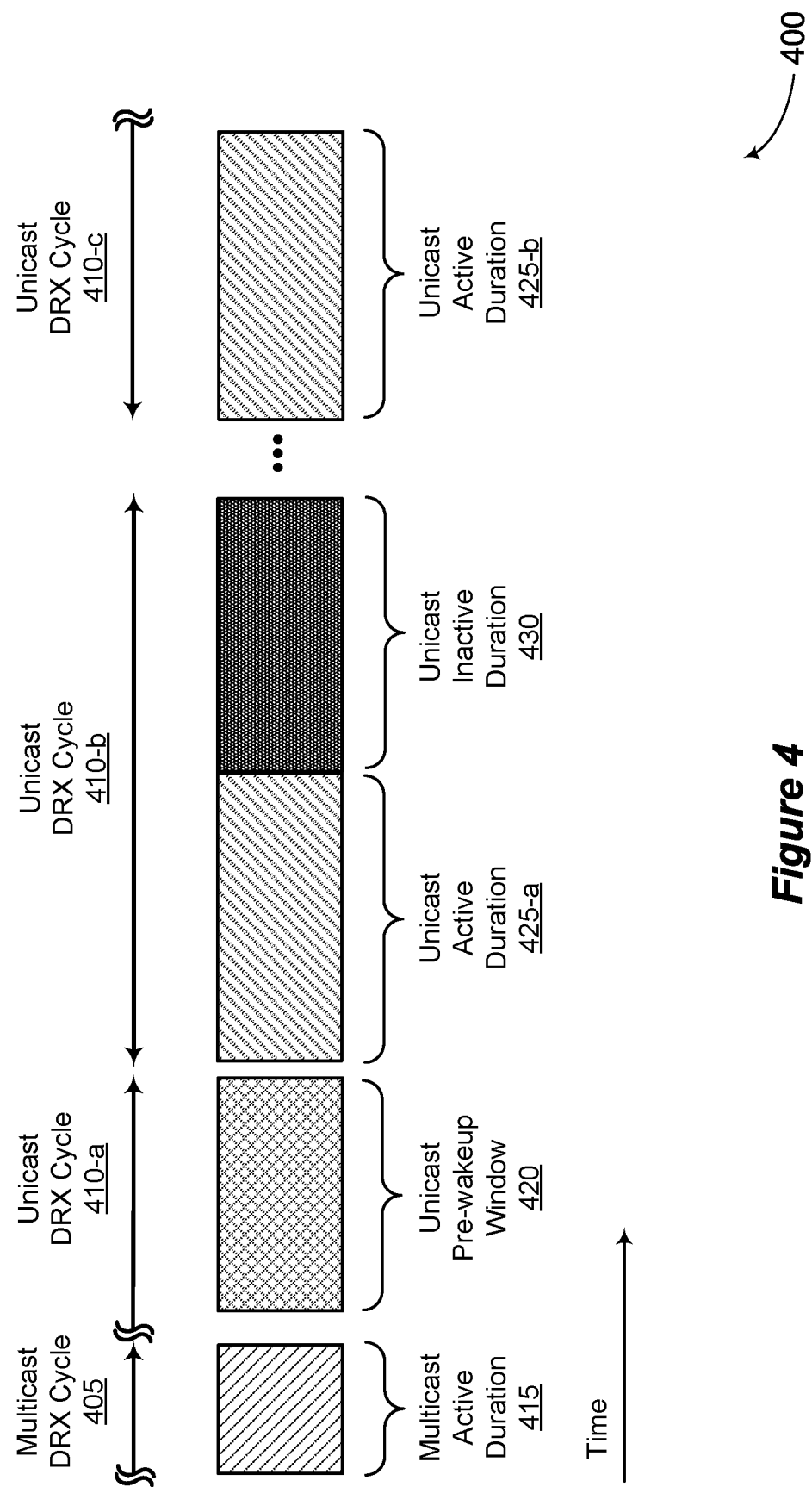

FIG. 4 illustrates an example of a timeline 400 that supports wakeup signals for NR multicast communications in accordance with aspects of the present disclosure. In some examples, the timeline 400 may also implement aspects of the wireless communications system 100 and 200, as described with reference to FIGS. 1 and 2. For example, the timeline 400 may be based on a configuration by a base station 105 or a UE 115, and implemented by the UE 115. In the example illustrated in FIG. 4, the timeline 400 is applicable to implementations or instances when the UE 115 is configured with DRX operation capability for unicast communications and multicast communications in 5G systems. For example, the timeline 400 may include one or more multicast DRX cycles and unicast DRX cycles that may correspond to time and frequency resources (for example, a symbol duration, a slot duration, a subframe duration, a frame duration, subcarriers, carriers).

The one or more multicast DRX cycles may include one or more of a multicast active duration and an inactive multicast duration. For example, a multicast DRX cycle 405 may include a multicast active duration 415 (also referred to as a multicast G-RNTI ON duration or a multicast connected mode DRX (CDRX) ON duration) or a multicast inactive duration (not shown). The one or more unicast DRX cycles may include one or more of a unicast pre-wakeup window, a unicast active duration, or a unicast inactive duration. For example, a unicast DRX cycle 410-a may include a unicast pre-wakeup window 420. In some examples, a unicast DRX cycle 410-b may include a unicast active duration 425-a (also referred to as unicast ON durations) and a unicast inactive duration 430 (also referred to as a unicast OFF duration). A unicast DRX cycle 410-c may also include a unicast active duration 425-b (also referred to as unicast ON durations) and a unicast inactive duration (not shown). One or more of a pre-wakeup window, an active duration, or an inactive duration associated with a multicast DRX cycle or a unicast DRX cycle, or both may correspond to time and frequency resources. For example, one or more of a pre-wakeup window, an active duration, or an inactive duration associated with a multicast DRX cycle or a unicast DRX cycle, or both may correspond to a number of subframe cycles, with each subframe in a cycle having a subframe index ranging from 0 to 9. Each subframe cycle or subframe index or both may relate to one or more symbols and subcarriers.

With reference to FIGS. 1 and 2, and in accordance with the timeline 400, a UE 115 may receive, from a base station 105, multicast communications (for example, multicast signals) over the multicast active duration 415 in the multicast DRX cycle 405. The base station 105 may configure the UE 115 independently for DRX operation for unicast communications and multicast communications. In some examples, the unicast pre-wakeup window 420 may be part of an inactive duration of the unicast DRX cycle 410-a to preserve resources (for example, time and frequency resources) or a battery life of the UE 115. The UE 115 may monitor the unicast pre-wakeup window 420 in the unicast DRX cycle 410-a for a wakeup signal for DRX operation.

The base station 105 may, in some examples, align a unicast pre-wakeup window to a multicast active duration of a multicast DRX cycle, and the UE 115 may, based on the alignment, support DRX operation for unicast communications and multicast communications. For example, the base station 105 may configure the multicast active duration 415 associated with the multicast DRX cycle 405 and the unicast pre-wakeup window 420 associated with the unicast DRX cycle 410-a to be proximate (for example, within a threshold number of symbols) in a time domain. As shown in FIG. 4, the base station 105 may configure the unicast pre-wakeup window 420 to occur after the multicast active duration 415. For example, the unicast pre-wakeup window 420 may occur a number of time resources (for example, symbols) after the multicast active duration 415. In some other examples, the base station 105 may configure the unicast pre-wakeup window 420 to occur before the multicast active duration 415. For example, the unicast pre-wakeup window 420 may occur a number of time resources (for example, symbols) before the multicast active duration 415. The base station 105 may configure the unicast pre-wakeup window 420 to alternatively occur within the multicast active duration 415. Here, the unicast pre-wakeup window 420 and the multicast active duration 415 may have overlapping resource in a time domain. Aligning the unicast pre-wakeup window 420 with the multicast active duration 415 may including aligning one or more of a symbol, a slot, a subframe, a frame associated with the unicast pre-wakeup window 420 with the multicast active duration 415.

In some examples, while monitoring the unicast pre-wakeup window 420, the UE 115 may receive, from a base station 105, a wakeup signal (for example, a unicast wakeup signal), which may carry an indication of a number of active durations (for example, one or more unicast active durations 425) of a number of unicast DRX cycles 410 for the UE 115. That is, the wakeup signal may indicate whether the UE 115 has to wake up for one or more unicast active durations 425 associated with one or more unicast DRX cycles 410. For example, the wakeup signal may provide an indication for the UE 115 to wake up in the unicast active duration 425-a associated with the unicast DRX cycle 410-b, as well as in the unicast active duration 425-b associated with the unicast DRX cycle 410-c.

In some examples, while in the unicast inactive duration 430 of the unicast DRX cycle 410-b, the UE 115 may enter a low power mode, and thereby reduce power consumption. The UE 115 may exit the low power mode in the active durations (for example, the one or more unicast active durations 425) of the one or more unicast DRX cycles 410. The active durations (for example, the one or more unicast active durations 425) of the one or more unicast DRX cycles 410 may be for a unicast service related to a RNTI. The UE 115 may receive, from the base station 105, unicast service-related information over the one or more unicast active durations 425 of the unicast DRX cycles 410 in accordance with the RNTI.

Figure 5:
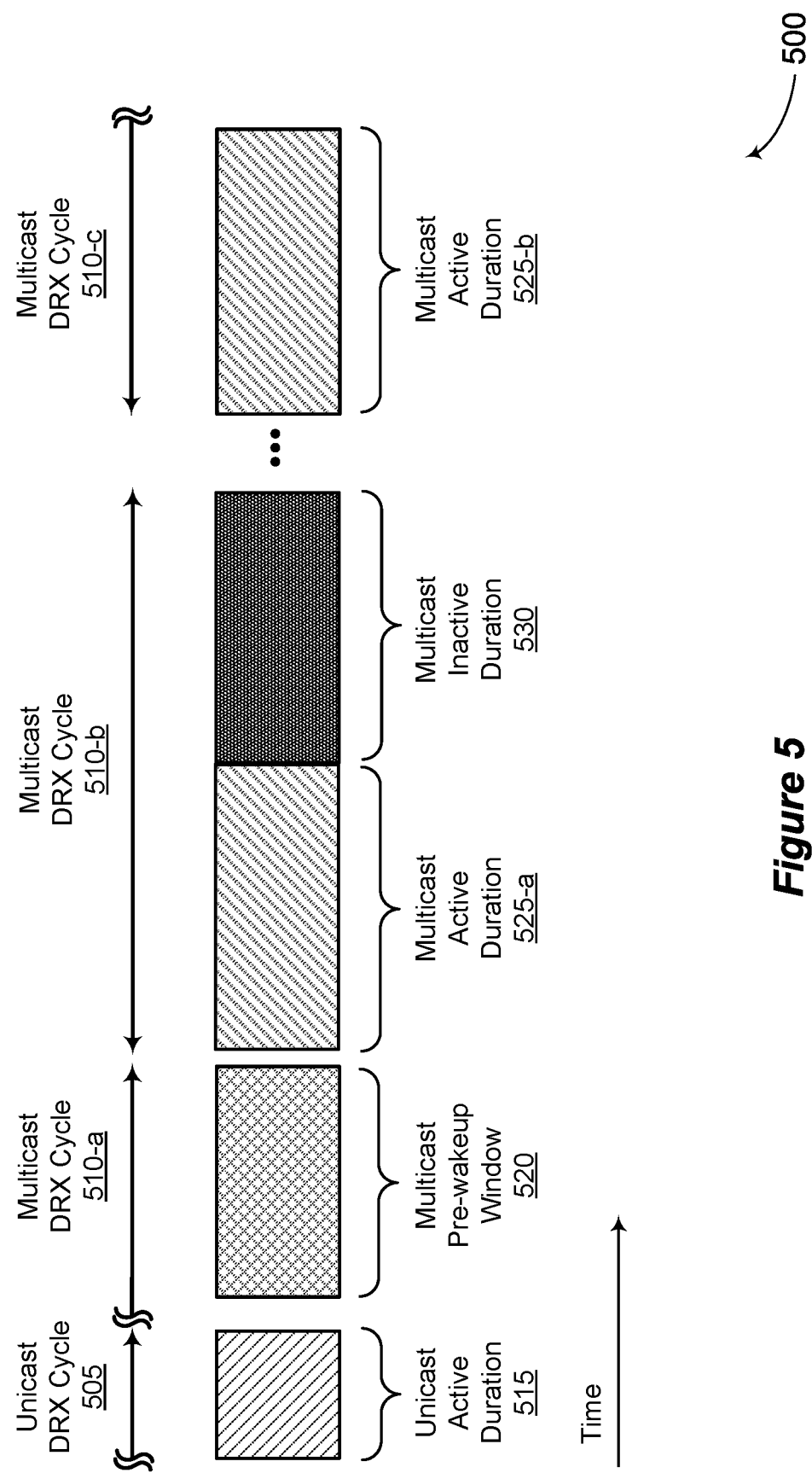

FIG. 5 illustrates an example of a timeline 500 that supports wakeup signals for NR multicast communications in accordance with aspects of the present disclosure. In some examples, the timeline 500 may also implement aspects of the wireless communications system 100 and 200, as described with reference to FIGS. 1 and 2. For example, the timeline 500 may be based on a configuration by a base station 105 or a UE 115, and implemented by the UE 115. In the example illustrated in FIG. 5, the timeline 500 is applicable to implementations or instances when the UE 115 is configured with DRX operation capability for unicast communications and multicast communications in 5G systems. For example, the timeline 500 may include one or more unicast DRX cycles and multicast DRX cycles that may correspond to time and frequency resources (for example, a symbol duration, a slot duration, a subframe duration, a frame duration, subcarriers, carriers)

The one or more unicast DRX cycles may include one or more of a unicast active duration and an inactive unicast duration. For example, a unicast DRX cycle 505 may include a unicast active duration 515 (also referred to as a unicast ON duration) or a unicast inactive duration (not shown). The one or more multicast DRX cycles may include one or more of a multicast pre-wakeup window, a multicast active duration, or a multicast inactive duration. For example, a multicast DRX cycle 510-a may include a multicast pre-wakeup window 520. In some examples, a multicast DRX cycle 510-b may include a multicast active duration 415 (also referred to as multicast G-RNTI ON durations) and a multicast inactive duration 530 (also referred to as a multicast G-RNTI OFF duration). A multicast DRX cycle 510-c may also include a multicast active duration 525-b and a multicast inactive duration (not shown). One or more of a pre-wakeup window, an active duration, or an inactive duration associated with a unicast DRX cycle or a multicast DRX cycle, or both may correspond to time and frequency resources. For example, one or more of a pre-wakeup window, an active duration, or an inactive duration associated with a unicast DRX cycle or a multicast DRX cycle, or both may correspond to a number of subframe cycles, with each subframe in a cycle having a subframe index ranging from 0 to 9. Each subframe cycle or subframe index or both may relate to one or more symbols and subcarriers.

With reference to FIGS. 1 and 2, and in accordance with the timeline 500, a UE 115 may receive, from a base station 105, unicast communications (for example, unicast signals) over the unicast active duration 515 in the unicast DRX cycle 505. The base station 105 may configure the UE 115 independently for DRX operation for unicast communications and multicast communications. In some examples, the multicast pre-wakeup window 520 may be part of an inactive duration of the multicast DRX cycle 510-a to preserve resources (for example, time and frequency resources) or a battery life of the UE 115. The UE 115 may monitor the multicast pre-wakeup window 520 in the multicast DRX cycle 510-a for a wakeup signal for DRX operation.

The base station 105 may, in some examples, align a multicast pre-wakeup window to a unicast active duration of a unicast DRX cycle, and the UE 115 may, based on the alignment, support DRX operation for unicast communications and multicast communications. For example, the base station 105 may configure the unicast active duration 515 associated with the unicast DRX cycle 505 and the multicast pre-wakeup window 520 associated with the multicast DRX cycle 510-a to be proximate (for example, within a threshold number of symbols) in a time domain. As shown in FIG. 5, the base station 105 may configure the multicast pre-wakeup window 520 to occur after the unicast active duration 515. For example, the multicast pre-wakeup window 520 may occur a number of time resources (for example, symbols) after the unicast active duration 515. In some other examples, the base station 105 may configure the multicast pre-wakeup window 520 to occur before the unicast active duration 515. For example, the multicast pre-wakeup window 520 may occur a number of time resources (for example, symbols) before the unicast active duration 515. The base station 105 may configure the multicast pre-wakeup window 520 to alternatively occur within the unicast active duration 515. Here, the multicast pre-wakeup window 520 and the unicast active duration 515 may have overlapping resource in a time domain (for example, symbols). Aligning the multicast pre-wakeup window 520 with the unicast active duration 515 may including aligning one or more of a symbol, a slot, a subframe, a frame associated with the multicast pre-wakeup window 520 with the unicast active duration 515.

In some examples, while monitoring the multicast pre-wakeup window 520, the UE 115 may receive, from a base station 105, a wakeup signal (for example, a unicast wakeup signal), which may carry an indication of a number of active durations (for example, one or more multicast active durations 525) of a number of multicast DRX cycles 510 for the UE 115. That is, the wakeup signal may indicate whether the UE 115 has to wake up for one or more multicast active durations 525 associated with one or more multicast DRX cycles 510. For example, the wakeup signal may provide an indication for the UE 115 to wake up in the multicast active duration 525-a associated with the multicast DRX cycle 510-b, as well as in the multicast active duration 525-b associated with the multicast DRX cycle 510-c.

In some examples, while in the multicast inactive duration 530 of the multicast DRX cycle 510-b, the UE 115 may enter a low power mode, and thereby reduce power consumption. The UE 115 may exit the low power mode in the active durations (for example, the one or more multicast active durations 525) of the one or more multicast DRX cycles 510.

The active durations (for example, the one or more multicast active durations 525) of the one or more multicast DRX cycles 510 may be for a multicast service related to a G-RNTI. The UE 115 may receive, from the base station 105, multicast service-related information over the one or more multicast active durations 525 of the multicast DRX cycles 510 in accordance with the G-RNTI.

Figure 6:
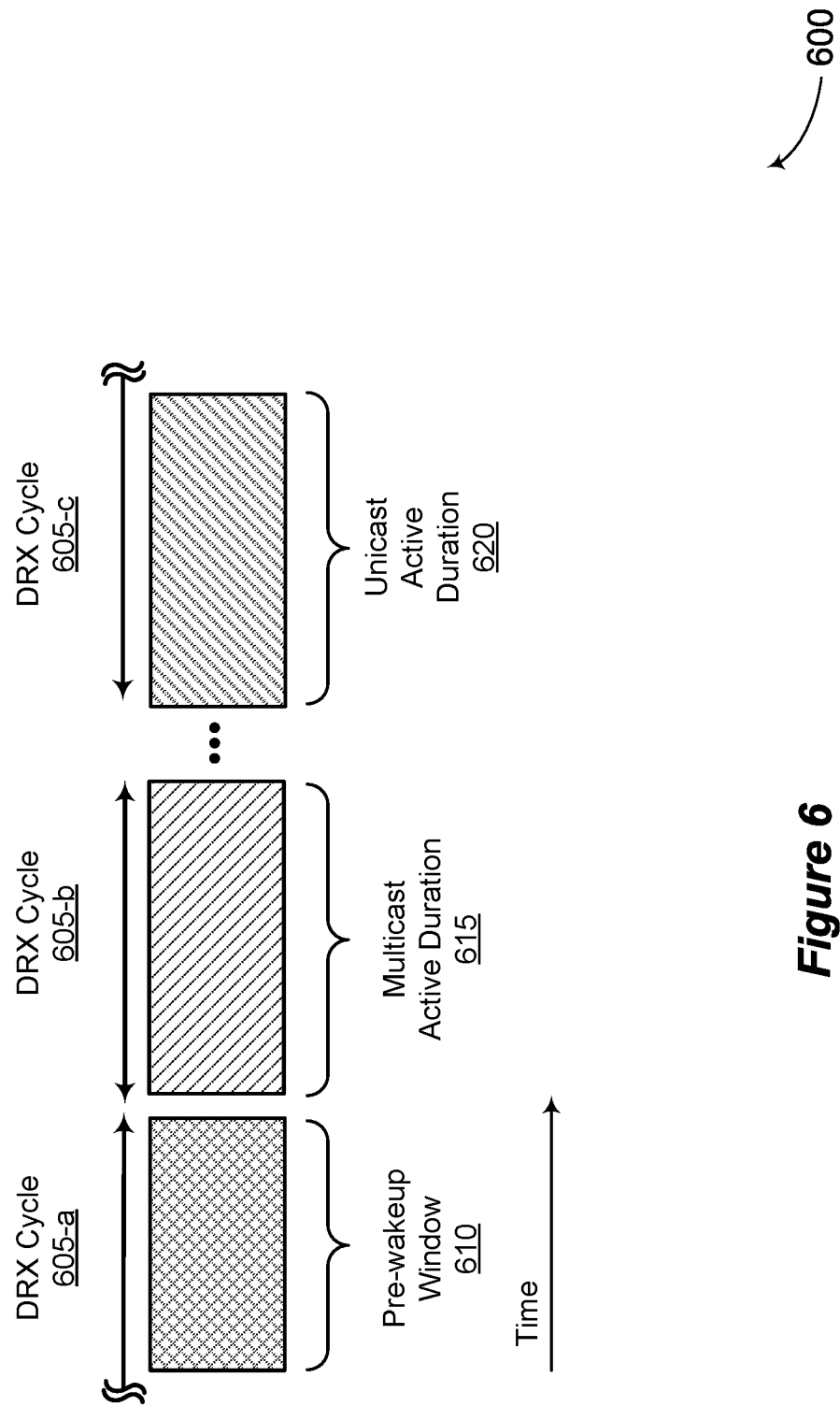

FIG. 6 illustrates an example of a timeline 600 that supports wakeup signals for NR multicast communications in accordance with aspects of the present disclosure. In some examples, the timeline 600 may also implement aspects of the wireless communications system 100 and 200, as described with reference to FIGS. 1 and 2. For example, the timeline 600 may be based on a configuration by a base station 105 or a UE 115, and implemented by the UE 115. In the example illustrated in FIG. 6, the timeline 600 is applicable to implementations or instances when the UE 115 is configured with DRX operation capability for unicast communications and multicast communications in 5G systems. For example, the timeline 600 may include one or more DRX cycles 605, which may be one or more multicast DRX cycles or unicast DRX cycles. The one or more DRX cycles 605 may correspond to time and frequency resources (for example, a symbol duration, a slot duration, a subframe duration, a frame duration, subcarriers, carriers).

The timeline 600 may include a pre-wakeup window 610 and one or more active durations, which may include a multicast active duration 615 or a unicast active duration 620, or both. One or more of the pre-wakeup window 610, the multicast active duration 615, and the unicast active duration 620 may correspond to time and frequency resources. For example, the pre-wakeup window 610, the multicast active duration 615, and the unicast active duration 620 may correspond to a number of subframe cycles, with each subframe in a cycle having a subframe index ranging from 0 to 9. Each subframe cycle or subframe index or both may relate to one or more symbols and subcarriers.

With reference to FIGS. 1 and 2, and in accordance with the timeline 600, a UE 115 may monitor the pre-wakeup window 610. In some examples, the pre-wakeup window 610 may be part of an inactive duration of a DRX cycle 605-a to preserve resources (for example, time and frequency resources) or a battery life of the UE 115. While monitoring the pre-wakeup window 610, the UE 115 may receive, from a base station 105, a wakeup signal, which may carry an indication of a number of active durations (for example, the multicast active duration 615 and the unicast active duration 620, or both) of a DRX cycle 605 for the UE 115. A single wakeup signal can indicate a wakeup for both unicast and multicast communications for the UE 115.

In some examples, the UE 115 may receive the wakeup signal over a portion of the pre-wakeup window 610, which may correspond to an overlap between a multicast pre-wakeup window and a unicast pre-wakeup window. That is, the wakeup signal may indicate whether the UE 115 has to wake up for the one or more active durations of the DRX cycle 605-b or the DRX cycle 605-c, which may correspond to unicast communications or multicast communications, or both. The number of active durations (for example, the multicast active duration 615 and the unicast active duration 620, or both) of the DRX cycle 605-b or the DRX cycle 605-c may be for a unicast service or a multicast service, or both. The UE 115 may receive, from the base station 105, unicast or multicast service-related information over the one or more active durations of the DRX cycles 605.

Figure 7:
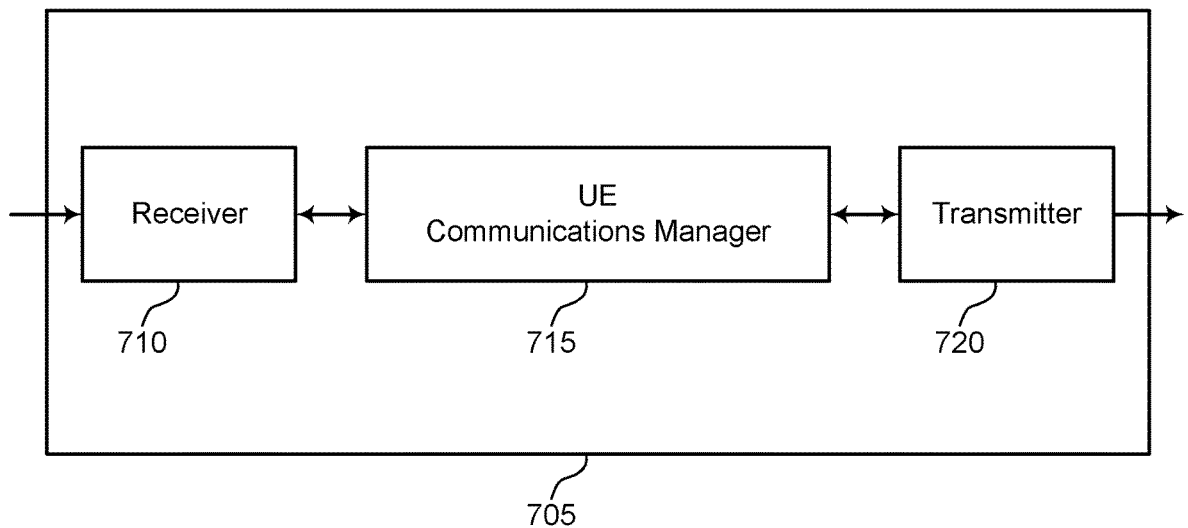
FIGS. 7 and 8 show block diagrams of devices that support wakeup signals for NR multicast communications in accordance with aspects of the present disclosure.

FIG. 7 shows a block diagram of a device 705 that supports wakeup signal for NR multicast communications in accordance with aspects of the present disclosure. The device 705 may be an example of aspects of a UE. The device 705 may include a receiver 710, a UE communications manager 715, and a transmitter 720. The UE communications manager 715 can be implemented, at least in part, by one or both of a modem and a processor. Each of these components may be in communication with one another (for example, via one or more buses).

The receiver 710 may receive information such as packets, user data, or control information associated with various information channels (for example, control channels, data channels, and information related to wakeup signal for NR multicast communications). Information may be passed on to other components of the device 705. The receiver 710 may be an example of aspects of the transceiver 1020 described with reference to FIG. 10. The receiver 710 may utilize a single antenna or a set of antennas.

The UE communications manager 715 may monitor a pre-wakeup window during an inactive duration of a multicast DRX cycle that includes a set of inactive durations and a set of active durations, receive, in the pre-wakeup window, a wakeup signal that indicates a quantity of active durations in the set of active durations of the multicast DRX cycle for the UE, and monitor the indicated quantity of active durations of the set of active durations for multicast signals for the UE during the set of active durations of the multicast DRX cycle. The UE communications manager 715 may be an example of aspects of the UE communications manager 1010 described herein.

The transmitter 720 may transmit signals generated by other components of the device 705. In some examples, the transmitter 720 may be collocated with a receiver 710 in a transceiver component. For example, the transmitter 720 may be an example of aspects of the transceiver 1020 described with reference to FIG. 10. The transmitter 720 may utilize a single antenna or a set of antennas.

Figure 8:
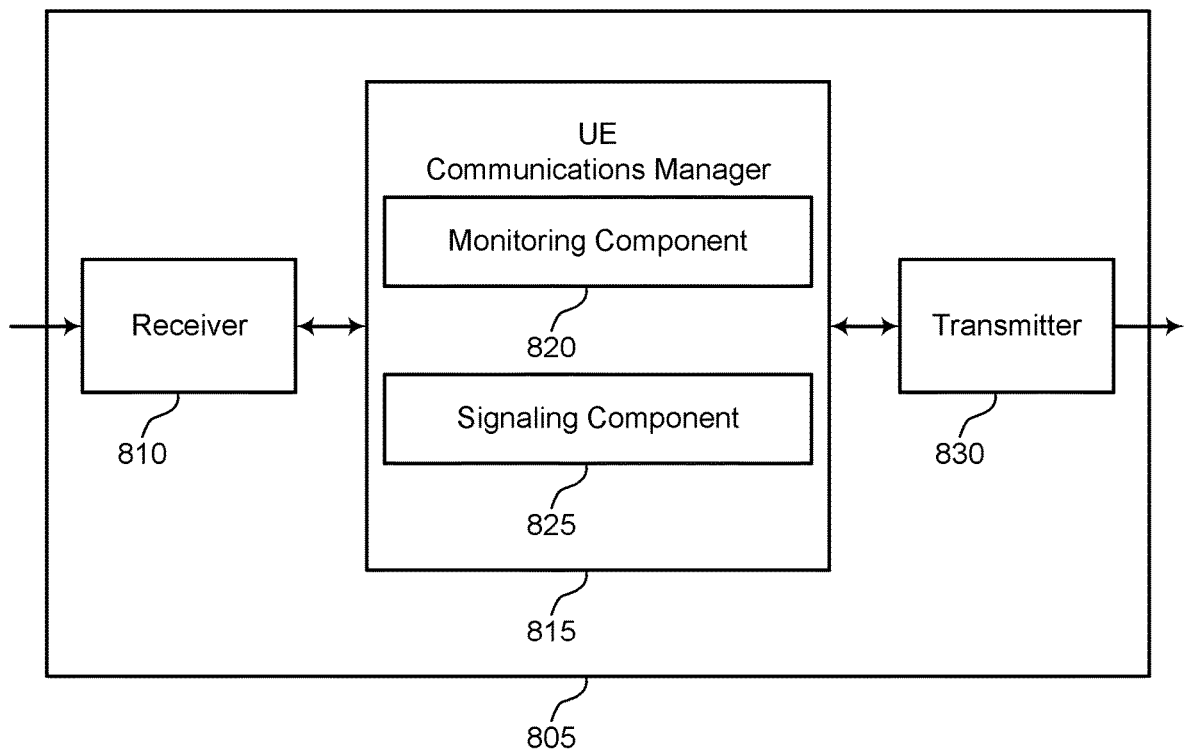

FIG. 8 shows a block diagram of a device 805 that supports wakeup signal for NR multicast communications in accordance with aspects of the present disclosure. The device 805 may be an example of aspects of a device 705, or a UE. The device 805 may include a receiver 810, a UE communications manager 815, and a transmitter 830. The UE communications manager 815 can be implemented, at least in part, by one or both of a modem and a processor. Each of these components may be in communication with one another (for example, via one or more buses).

The receiver 810 may receive information such as packets, user data, or control information associated with various information channels (for example, control channels, data channels, and information related to wakeup signal for NR multicast communications). Information may be passed on to other components of the device 805. The receiver 810 may be an example of aspects of the transceiver 1020 described with reference to FIG. 10. The receiver 810 may utilize a single antenna or a set of antennas.

The UE communications manager 815 may include a monitoring component 820 and a signaling component 825.

The monitoring component 820 may monitor a pre-wakeup window during an inactive duration of a multicast DRX cycle that includes a set of inactive durations and a set of active durations. The signaling component 825 may receive, in the pre-wakeup window, a wakeup signal that indicates a quantity of active durations in the set of active durations of the multicast DRX cycle for the UE and monitor the indicated quantity of active durations of the set of active durations for multicast signals for the UE during the set of active durations of the multicast DRX cycle.

The transmitter 830 may transmit signals generated by other components of the device 805. In some examples, the transmitter 830 may be collocated with a receiver 810 in a transceiver component. For example, the transmitter 830 may be an example of aspects of the transceiver 1020 described with reference to FIG. 10. The transmitter 830 may utilize a single antenna or a set of antennas.

Figure 9:
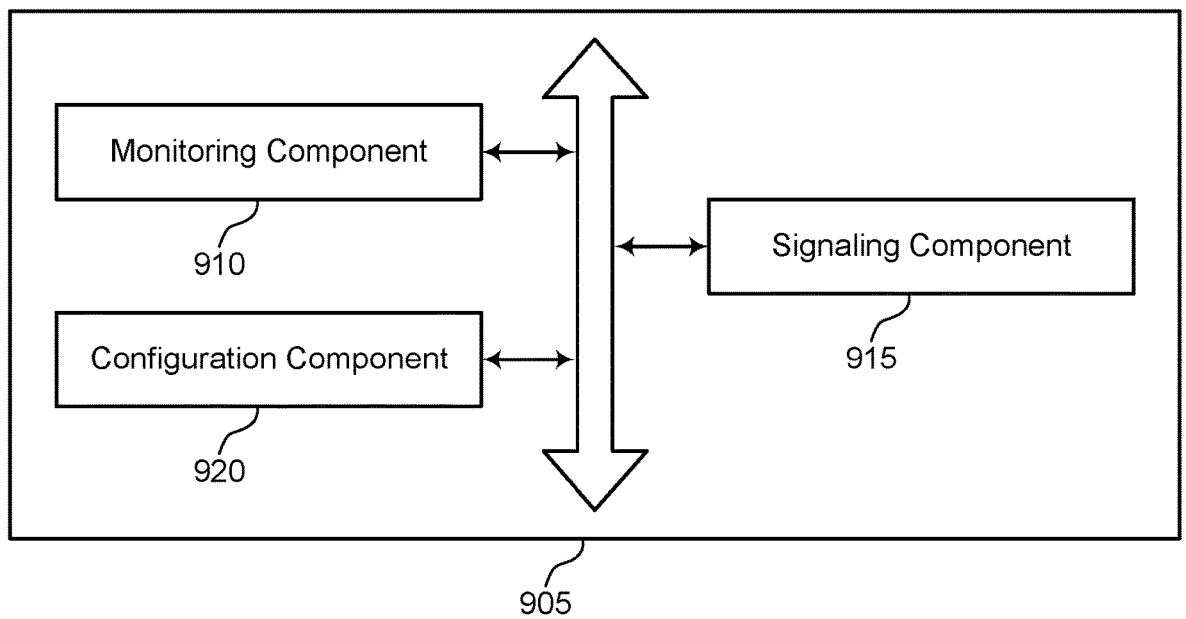
FIG. 9 shows a block diagram of a communications manager that supports wakeup signals for NR multicast communications in accordance with aspects of the present disclosure.

FIG. 9 shows a block diagram of a UE communications manager 905 that supports wakeup signal for NR multicast communications in accordance with aspects of the present disclosure. The UE communications manager 905 may include a monitoring component 910, a signaling component 915, and a configuration component 920. Each of these components may communicate, directly or indirectly, with one another (for example, via one or more buses).

The monitoring component 910 may monitor a pre-wakeup window during an inactive duration of a multicast DRX cycle that includes a set of inactive durations and a set of active durations. In some examples, the monitoring component 910 may monitor a second pre-wakeup window during an inactive duration of a unicast DRX cycle that includes a set of inactive durations and a set of active durations. In some implementations, the set of active durations of the unicast DRX cycle is for a unicast service that corresponds to a RNTI. In some implementations, the pre-wakeup window includes a multicast pre-wakeup window and the second pre-wakeup window includes a unicast pre-wakeup window. In some implementations, the unicast pre-wakeup window is within a threshold number of symbols of the set of active durations of the multicast DRX cycle. In some implementations, the unicast pre-wakeup window occurs within the set of active durations of the multicast DRX cycle.

In some implementations, the unicast pre-wakeup window occurs before the set of active durations of the multicast DRX cycle. In some implementations, the unicast pre-wakeup window occurs after the set of active durations of the multicast DRX cycle. In some implementations, the multicast pre-wakeup window is within a threshold number of symbols of the set of active durations of the unicast DRX cycle. In some implementations, the multicast pre-wakeup window occurs within the set of active durations of the unicast DRX cycle. In some implementations, the multicast pre-wakeup window occurs before the set of active durations of the unicast DRX cycle. In some implementations, the multicast pre-wakeup window occurs after the set of active durations of the unicast DRX cycle. In some implementations, the multicast pre-wakeup window at least partially overlaps the unicast pre-wakeup window.

The signaling component 915 may receive, in the pre-wakeup window, a wakeup signal that indicates a quantity of active durations in the set of active durations of the multicast DRX cycle for the UE. In some examples, the signaling component 915 may monitor the indicated quantity of active durations of the set of active durations for multicast signals for the UE during the set of active durations of the multicast DRX cycle. In some examples, the signaling component 915 may receive, in the second pre-wakeup window, a second wakeup signal that indicates a quantity of active durations in the set of active durations of the unicast DRX cycle for the UE. In some examples, the signaling component 915 may monitor the indicated quantity of active durations of the set of active durations for unicast signals for the UE during the unicast DRX cycle. In some examples, the signaling component 915 may receive the wakeup signal over a portion of the multicast pre-wakeup window that overlaps the unicast pre-wakeup window. In some examples, the wakeup signal includes an indication of the quantity of active durations of the set of active durations of the multicast DRX cycle and the quantity of active durations of the set of active durations of the unicast DRX cycle. In some implementations, the set of active durations of the multicast DRX cycle is for a multicast service that corresponds to a G-RNTI.

The configuration component 920 may receive a message including a configuration of the pre-wakeup window associated with the multicast signals. In some examples, monitoring the pre-wakeup window is based on the configuration. In some examples, the configuration component 920 may receive a message including a configuration of the second pre-wakeup window associated with the unicast signals. In some examples, monitoring the second pre-wakeup window is based on the configuration. In some implementations, the configuration includes an RRC configuration.

Figure 10:
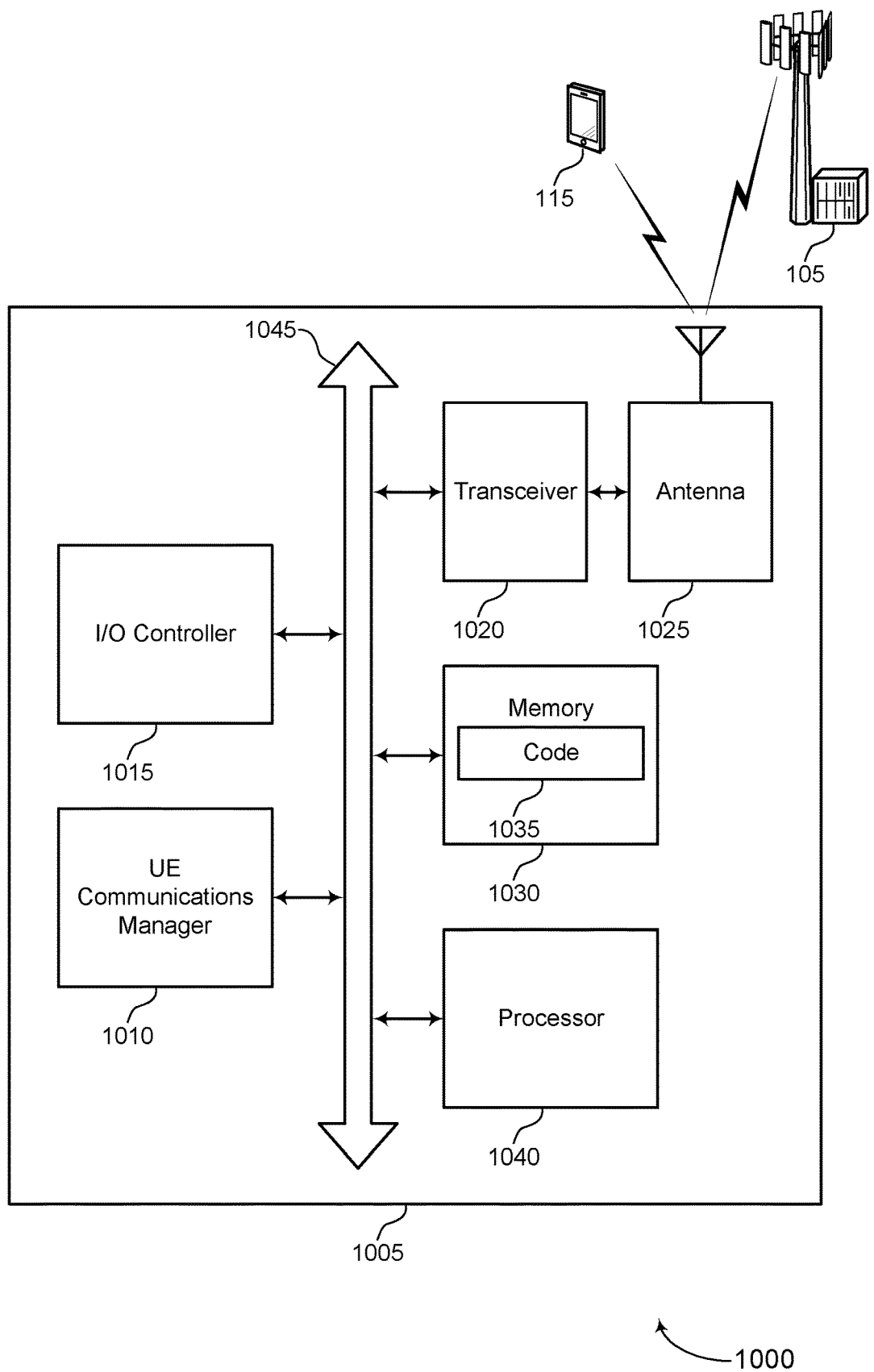
FIG. 10 shows a diagram of a system including a device that supports wakeup signals for NR multicast communications in accordance with aspects of the present disclosure.

FIG. 10 shows a diagram of a system 1000 including a device 1005 that supports wakeup signal for NR multicast communications in accordance with aspects of the present disclosure. The device 1005 may be an example of or include the components of device 705, device 805, or a UE 115. The device 1005 may include components for bi-directional voice and data communications including components for transmitting and receiving communications, including a UE communications manager 1010, an input/output (I/O) controller 1015, a transceiver 1020, an antenna 1025, memory 1030, and a processor 1040. These components may be in electronic communication via one or more buses (for example, bus 1045).

The UE communications manager 1010 may monitor a pre-wakeup window during an inactive duration of a multicast DRX cycle that includes a set of inactive durations and a set of active durations, receive, in the pre-wakeup window, a wakeup signal that indicates a quantity of active durations in the set of active durations of the multicast DRX cycle for the UE, and monitor the indicated quantity of active durations of the set of active durations for multicast signals for the UE during the set of active durations of the multicast DRX cycle.

The I/O controller 1015 may manage input and output signals for the device 1005. The I/O controller 1015 may also manage peripherals not integrated into the device 1005. In some implementations, the I/O controller 1015 may represent a physical connection or port to an external peripheral. In some implementations, the I/O controller 1015 may utilize an operating system such as iOS®, ANDROID®, MS-DOS®, MS-WINDOWS®, OS/2®, UNIX®, LINUX®, or another known operating system. In other cases, the I/O controller 1015 may represent or interact with a modem, a keyboard, a mouse, a touchscreen, or a similar device. In some implementations, the I/O controller 1015 may be implemented as part of a processor. In some implementations, a user may interact with the device 1005 via the I/O controller 1015 or via hardware components controlled by the I/O controller 1015.

The transceiver 1020 may communicate bi-directionally, via one or more antennas, wired, or wireless links as described above. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas. In some implementations, the device 1005 may include a single antenna 1025. However, in some implementations the device 1005 may have more than one antenna 1025, which may be capable of concurrently transmitting or receiving multiple wireless transmissions.

The memory 1030 may include random access memory (RAM) and read only memory (ROM). The memory 1030 may store computer-readable, computer-executable code 1035 including instructions that, when executed, cause the processor to perform various functions described herein. In some implementations, the memory 1030 may contain, among other things, a basic I/O system (BIOS) which may control basic hardware or software operation such as the interaction with peripheral components or devices.

The processor 1040 may include an intelligent hardware device, (for example, a general-purpose processor, a digital signal processor (DSP), a central processing unit (CPU), a microcontroller, an application-specific integrated circuit (ASIC), a field programmable gate array (FPGA), a programmable logic device, a discrete gate or transistor logic component, a discrete hardware component, or any combination thereof). In some implementations, the processor 1040 may be configured to operate a memory array using a memory controller. In other cases, a memory controller may be integrated into the processor 1040. The processor 1040 may be configured to execute computer-readable instructions stored in a memory (for example, the memory 1030) to cause the device 1005 to perform various functions (for example, functions or tasks supporting wakeup signal for NR multicast communications).

The code 1035 may include instructions to implement aspects of the present disclosure, including instructions to support wireless communications. The code 1035 may be stored in a non-transitory computer-readable medium such as system memory or other type of memory. In some implementations, the code 1035 may not be directly executable by the processor 1040 but may cause a computer (for example, when compiled and executed) to perform functions described herein.

Figure 11:
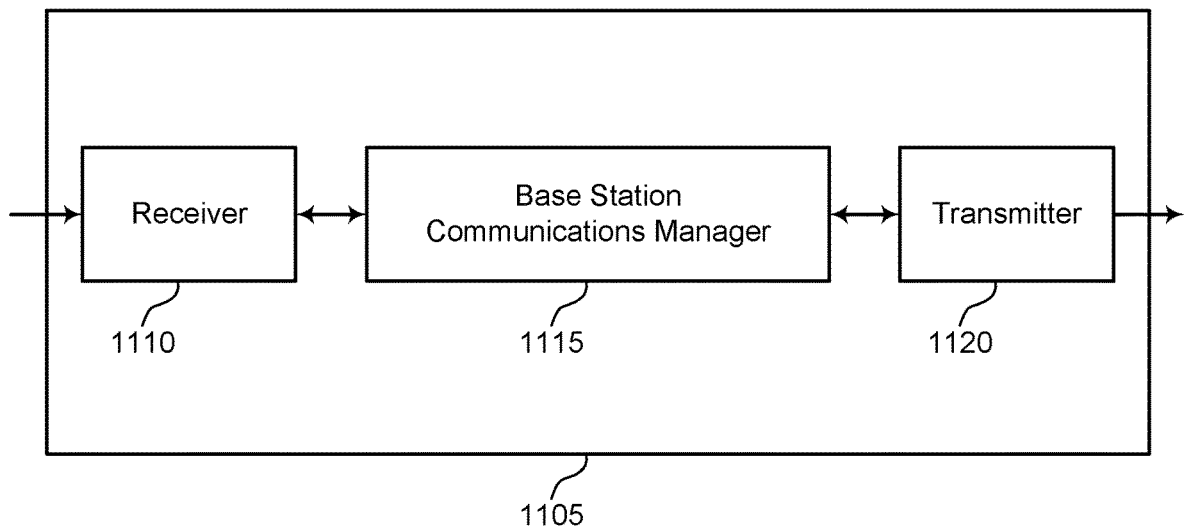
FIGS. 11 and 12 show block diagrams of devices that support wakeup signals for NR multicast communications in accordance with aspects of the present disclosure.

FIG. 11 shows a block diagram of a device 1105 that supports wakeup signal for NR multicast communications in accordance with aspects of the present disclosure. The device 1105 may be an example of aspects of a base station 105. The device 1105 may include a receiver 1110, a base station communications manager 1115, and a transmitter 1120. The base station communications manager 1115 can be implemented, at least in part, by one or both of a modem and a processor. Each of these components may be in communication with one another (for example, via one or more buses).

The receiver 1110 may receive information such as packets, user data, or control information associated with various information channels (for example, control channels, data channels, and information related to wakeup signal for NR multicast communications). Information may be passed on to other components of the device 1105. The receiver 1110 may be an example of aspects of the transceiver 1420 described with reference to FIG. 14. The receiver 1110 may utilize a single antenna or a set of antennas.

The base station communications manager 1115 may determine a pre-wakeup window during an inactive duration of a multicast DRX cycle that includes a set of inactive durations and a set of active durations, transmit, in the pre-wakeup window, a wakeup signal that indicates a quantity of active durations in the set of active durations of the multicast DRX cycle for a UE, and transmit one or more multicast signals in the indicated quantity of active durations of the set of active durations of the multicast DRX cycle. The base station communications manager 1115 may be an example of aspects of the base station communications manager 1410 described herein.

The transmitter 1120 may transmit signals generated by other components of the device 1105. In some examples, the transmitter 1120 may be collocated with a receiver 1110 in a transceiver component. For example, the transmitter 1120 may be an example of aspects of the transceiver 1420 described with reference to FIG. 14. The transmitter 1120 may utilize a single antenna or a set of antennas.

Figure 12:
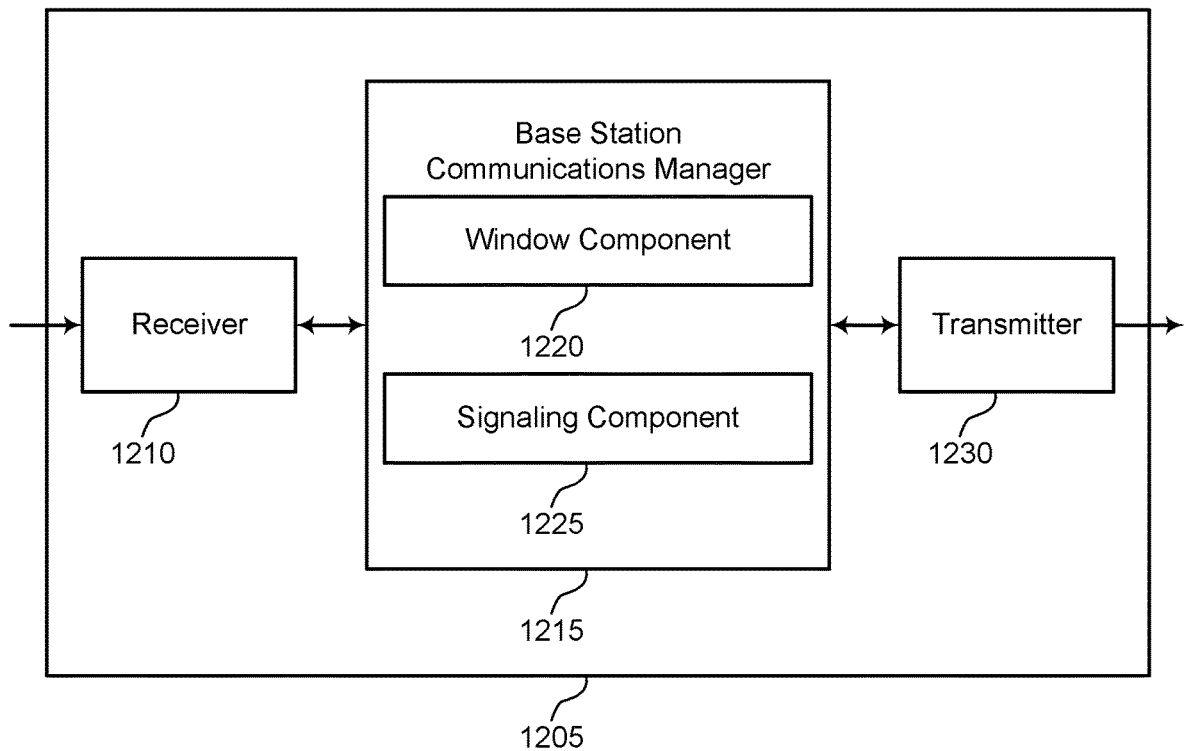

FIG. 12 shows a block diagram of a device 1205 that supports wakeup signal for NR multicast communications in accordance with aspects of the present disclosure. The device 1205 may be an example of aspects of a device 1105, or a base station 105. The device 1205 may include a receiver 1210, a base station communications manager 1215, and a transmitter 1230. The base station communications manager 1215 can be implemented, at least in part, by one or both of a modem and a processor. Each of these components may be in communication with one another (for example, via one or more buses).

The receiver 1210 may receive information such as packets, user data, or control information associated with various information channels (for example, control channels, data channels, and information related to wakeup signal for NR multicast communications). Information may be passed on to other components of the device 1205. The receiver 1210 may be an example of aspects of the transceiver 1420 described with reference to FIG. 14. The receiver 1210 may utilize a single antenna or a set of antennas.

The base station communications manager 1215 may include a window component 1220 and a signaling component 1225.

The window component 1220 may determine a pre-wakeup window during an inactive duration of a multicast DRX cycle that includes a set of inactive durations and a set of active durations. The signaling component 1225 may transmit, in the pre-wakeup window, a wakeup signal that indicates a quantity of active durations in the set of active durations of the multicast DRX cycle for a UE and transmit one or more multicast signals in the indicated quantity of active durations of the set of active durations of the multicast DRX cycle.

The transmitter 1230 may transmit signals generated by other components of the device 1205. In some examples, the transmitter 1230 may be collocated with a receiver 1210 in a transceiver component. For example, the transmitter 1230 may be an example of aspects of the transceiver 1420 described with reference to FIG. 14. The transmitter 1230 may utilize a single antenna or a set of antennas.

Figure 13:
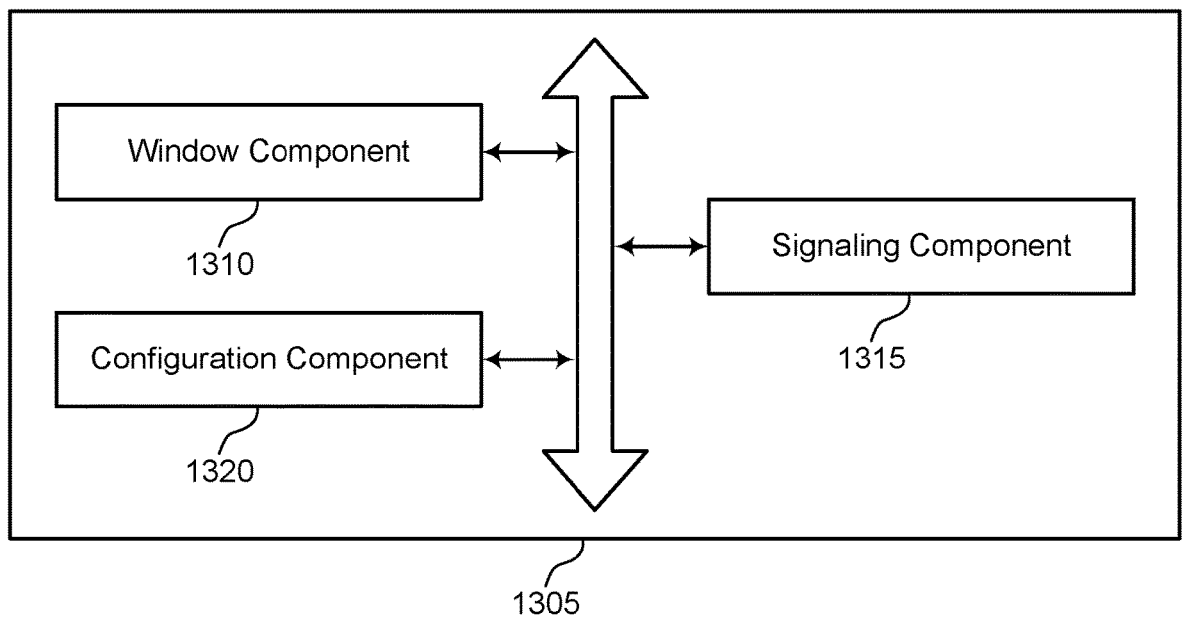
FIG. 13 shows a block diagram of a communications manager that supports wakeup signals for NR multicast communications in accordance with aspects of the present disclosure.

FIG. 13 shows a block diagram of a base station communications manager 1305 that supports wakeup signal for NR multicast communications in accordance with aspects of the present disclosure. The base station communications manager 1305 may be an example of aspects of a base station communications manager 1115, a base station communications manager 1215, or a base station communications manager 1410 described herein. The base station communications manager 1305 may include a window component 1310, a signaling component 1315, and a configuration component 1320. Each of these components may communicate, directly or indirectly, with one another (for example, via one or more buses).

The window component 1310 may determine a pre-wakeup window during an inactive duration of a multicast DRX cycle that includes a set of inactive durations and a set of active durations. In some examples, the window component 1310 may determine a second pre-wakeup window during an inactive duration of a unicast DRX cycle that includes a set of inactive durations and a set of active durations. In some implementations, the set of active durations of the unicast DRX cycle is for a unicast service that corresponds to a RNTI. In some implementations, the pre-wakeup window includes a multicast pre-wakeup window and the second pre-wakeup window includes a unicast pre-wakeup window. In some implementations, the unicast pre-wakeup window is within a threshold number of symbols of the set of active durations of the multicast DRX cycle. In some implementations, the unicast pre-wakeup window occurs within the set of active durations of the multicast DRX cycle. In some implementations, the unicast pre-wakeup window occurs before the set of active durations of the multicast DRX cycle. In some implementations, the unicast pre-wakeup window occurs after the set of active durations of the multicast DRX cycle.

In some implementations, the multicast pre-wakeup window is within a threshold number of symbols of the set of active durations of the unicast DRX cycle. In some implementations, the multicast pre-wakeup window occurs within the set of active durations of the unicast DRX cycle. In some implementations, the multicast pre-wakeup window occurs before the set of active durations of the unicast DRX cycle. In some implementations, the multicast pre-wakeup window occurs after the set of active durations of the unicast DRX cycle. In some implementations, the multicast pre-wakeup window at least partially overlaps the unicast pre-wakeup window.

The signaling component 1315 may transmit, in the pre-wakeup window, a wakeup signal that indicates a quantity of active durations in the set of active durations of the multicast DRX cycle for a UE. In some examples, the signaling component 1315 may transmit one or more multicast signals in the indicated quantity of active durations of the set of active durations of the multicast DRX cycle. In some examples, the signaling component 1315 may transmit, in the second pre-wakeup window, a second wakeup signal that indicates a quantity of active durations in the set of active durations of the unicast DRX cycle for the UE. In some examples, the signaling component 1315 may transmit, based on the second wakeup signal, unicast signals for the UE during the set of active durations of the unicast DRX cycle.

In some examples, the signaling component 1315 may transmit the wakeup signal over a portion of the multicast pre-wakeup window that overlaps the unicast pre-wakeup window. In some examples, the wakeup signal includes an indication of the quantity of active durations of the set of active durations of the multicast DRX cycle and the quantity of active durations of the set of active durations of the unicast DRX cycle. In some implementations, the set of active durations of the multicast DRX cycle is for a multicast service that corresponds to a G-RNTI. The configuration component 1320 may transmit a message including a configuration of the pre-wakeup window associated with the multicast signals. In some examples, monitoring the pre-wakeup window is based on the configuration. In some examples, the configuration component 1320 may transmit a message including a configuration of the second pre-wakeup window associated with the unicast signals. In some examples, monitoring the second pre-wakeup window is based on the configuration. In some implementations, the configuration includes an RRC configuration.

Figure 14:
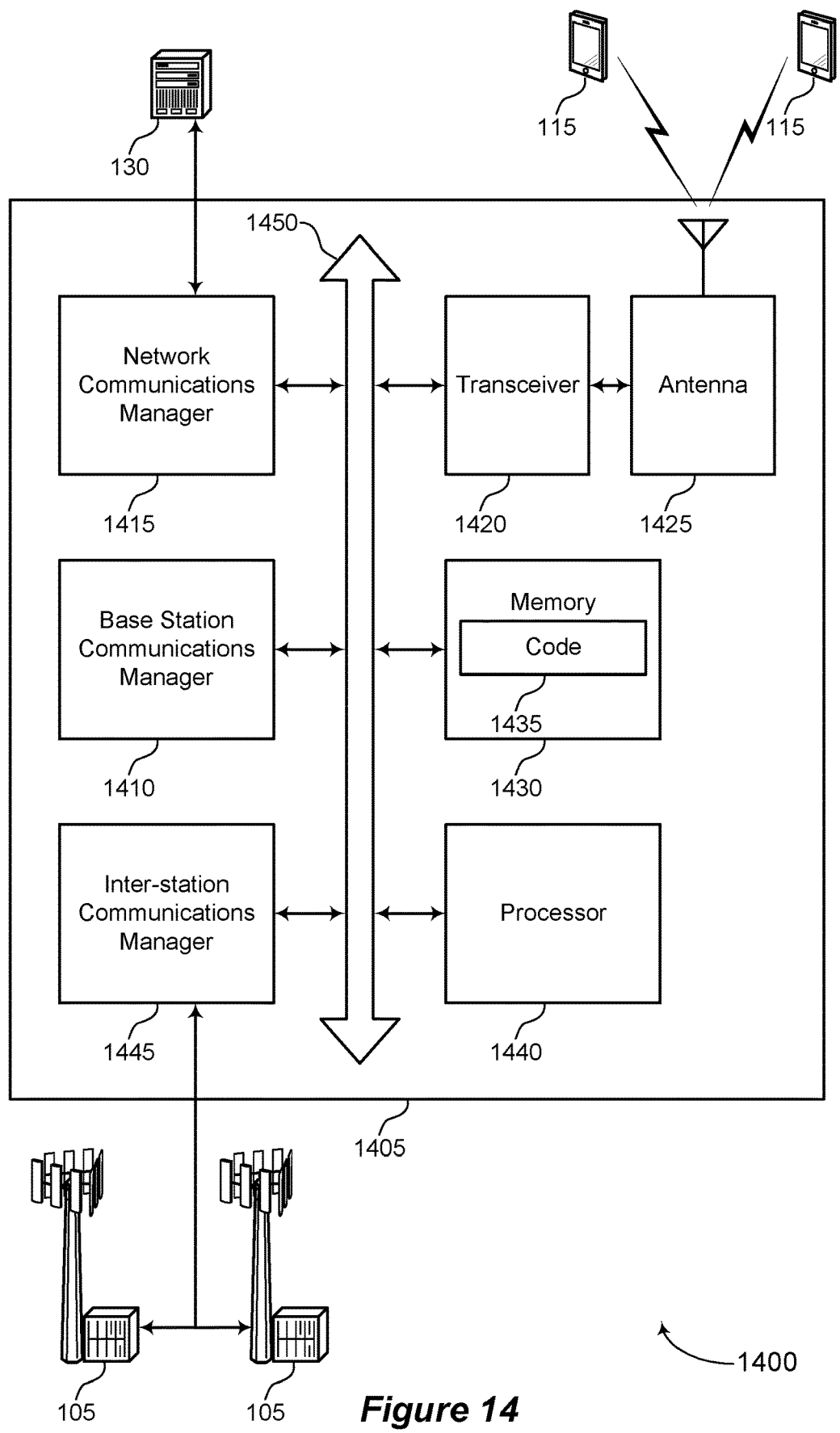
FIG. 14 shows a diagram of a system including a device that supports wakeup signals for NR multicast communications in accordance with aspects of the present disclosure.

FIG. 14 shows a diagram of a system 1400 including a device 1405 that supports wakeup signal for NR multicast communications in accordance with aspects of the present disclosure. The device 1405 may be an example of or include the components of device 1105, device 1205, or a base station. The device 1405 may include components for bi-directional voice and data communications including components for transmitting and receiving communications, including a base station communications manager 1410, a network communications manager 1415, a transceiver 1420, an antenna 1425, memory 1430, a processor 1440, and an inter-station communications manager 1445. These components may be in electronic communication via one or more buses (for example, bus 1450).

The base station communications manager 1410 may determine a pre-wakeup window during an inactive duration of a multicast DRX cycle that includes a set of inactive durations and a set of active durations, transmit, in the pre-wakeup window, a wakeup signal that indicates a quantity of active durations in the set of active durations of the multicast DRX cycle for a UE, and transmit one or more multicast signals in the indicated quantity of active durations of the set of active durations of the multicast DRX cycle.

The network communications manager 1415 may manage communications with the core network (for example, via one or more wired backhaul links). For example, the network communications manager 1415 may manage the transfer of data communications for client devices, such as one or more UEs 115.

The transceiver 1420 may communicate bi-directionally, via one or more antennas, wired, or wireless links as described above. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas. In some implementations, the device 1405 may include a single antenna 1425. However, in some implementations the device 1405 may have more than one antenna 1425, which may be capable of concurrently transmitting or receiving multiple wireless transmissions.

The memory 1430 may include RAM, ROM, or a combination thereof. The memory 1430 may store computer-readable code 1435 including instructions that, when executed by a processor (for example, the processor 1440) cause the device to perform various functions described herein. In some implementations, the memory 1430 may contain, among other things, a BIOS which may control basic hardware or software operation such as the interaction with peripheral components or devices.

The processor 1440 may include an intelligent hardware device, (for example, a general-purpose processor, a DSP, a CPU, a microcontroller, an ASIC, an FPGA, a programmable logic device, a discrete gate or transistor logic component, a discrete hardware component, or any combination thereof). In some implementations, the processor 1440 may be configured to operate a memory array using a memory controller. In some implementations, a memory controller may be integrated into processor 1440. The processor 1440 may be configured to execute computer-readable instructions stored in a memory (for example, the memory 1430) to cause the device 1405 to perform various functions (for example, functions or tasks supporting wakeup signal for NR multicast communications).

The inter-station communications manager 1445 may manage communications with other base station 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communication network technology to provide communication between base stations 105.

The code 1435 may include instructions to implement aspects of the present disclosure, including instructions to support wireless communications. The code 1435 may be stored in a non-transitory computer-readable medium such as system memory or other type of memory. In some implementations, the code 1435 may not be directly executable by the processor 1440 but may cause a computer (for example, when compiled and executed) to perform functions described herein.

Figure 15:
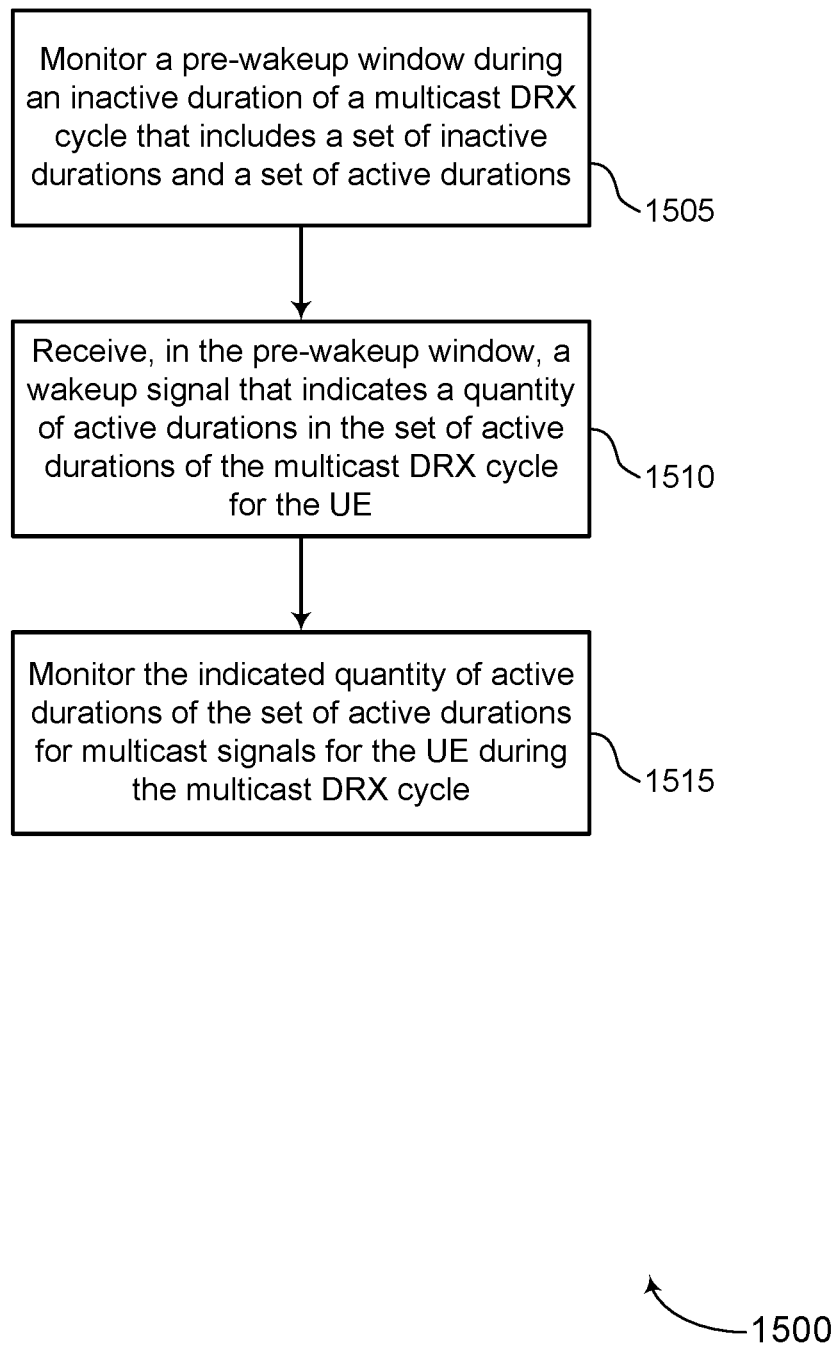
FIGS. 15-18 show flowcharts illustrating methods that support wakeup signals for NR multicast communications in accordance with aspects of the present disclosure.

FIG. 15 shows a flowchart illustrating a method 1500 that supports wakeup signal for NR multicast communications in accordance with aspects of the present disclosure. The operations of method 1500 may be implemented by a UE 115 or its components. For example, the operations of method 1500 may be performed by a communications manager as described with reference to FIGS. 7-10. In some examples, a UE may execute a set of instructions to control the functional elements of the UE to perform the functions described below. Additionally or alternatively, a UE may perform aspects of the functions described below using special-purpose hardware.

At 1505, the UE may monitor a pre-wakeup window during an inactive duration of a multicast DRX cycle that includes a set of inactive durations and a set of active durations. The operations of 1505 may be performed according to the methods described herein. In some examples, aspects of the operations of 1505 may be performed by a monitoring component as described with reference to FIGS. 7-10.

At 1510, the UE may receive, in the pre-wakeup window, a wakeup signal that indicates a quantity of active durations in the set of active durations of the multicast DRX cycle for the UE. The operations of 1510 may be performed according to the methods described herein. In some examples, aspects of the operations of 1510 may be performed by a signaling component as described with reference to FIGS. 7-10.

At 1515, the UE may monitor in the pre-wakeup window, a wakeup signal that indicates a quantity of active durations in the set of active durations of the multicast DRX cycle for the UE. The operations of 1515 may be performed according to the methods described herein. In some examples, aspects of the operations of 1515 may be performed by a signaling component as described with reference to FIGS. 7-10.

Figure 16:
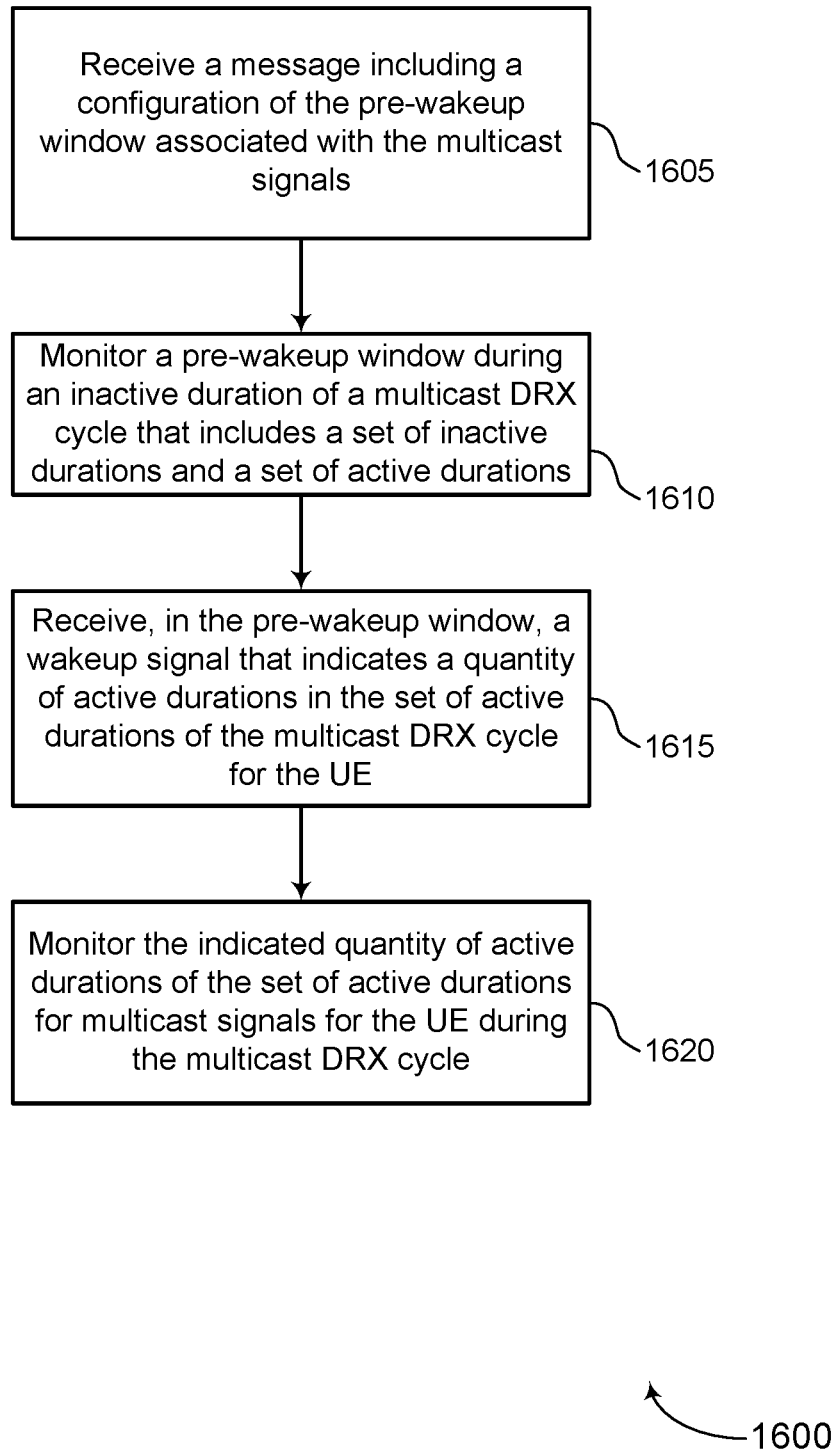

FIG. 16 shows a flowchart illustrating a method 1600 that supports wakeup signal for NR multicast communications in accordance with aspects of the present disclosure. The operations of method 1600 may be implemented by a UE 115 or its components. For example, the operations of method 1600 may be performed by a communications manager as described with reference to FIGS. 7-10. In some examples, a UE may execute a set of instructions to control the functional elements of the UE to perform the functions described below. Additionally or alternatively, a UE may perform aspects of the functions described below using special-purpose hardware.

At 1605, the UE may receive a message including a configuration of the pre-wakeup window associated with the multicast signals. The operations of 1605 may be performed according to the methods described herein. In some examples, aspects of the operations of 1605 may be performed by a configuration component as described with reference to FIGS. 7-10.

At 1610, the UE may monitor a pre-wakeup window during an inactive duration of a multicast DRX cycle that includes a set of inactive durations and a set of active durations. The operations of 1610 may be performed according to the methods described herein. In some examples, aspects of the operations of 1610 may be performed by a monitoring component as described with reference to FIGS. 7-10.

At 1615, the UE may receive, in the pre-wakeup window, a wakeup signal that indicates a quantity of active durations in the set of active durations of the multicast DRX cycle for the UE. The operations of 1615 may be performed according to the methods described herein. In some examples, aspects of the operations of 1615 may be performed by a signaling component as described with reference to FIGS. 7-10.

At 1620, the UE may monitor the indicated quantity of active durations of the set of active durations for multicast signals for the UE during the multicast DRX cycle. The operations of 1620 may be performed according to the methods described herein. In some examples, aspects of the operations of 1620 may be performed by a signaling component as described with reference to FIGS. 7-10.

Figure 17:
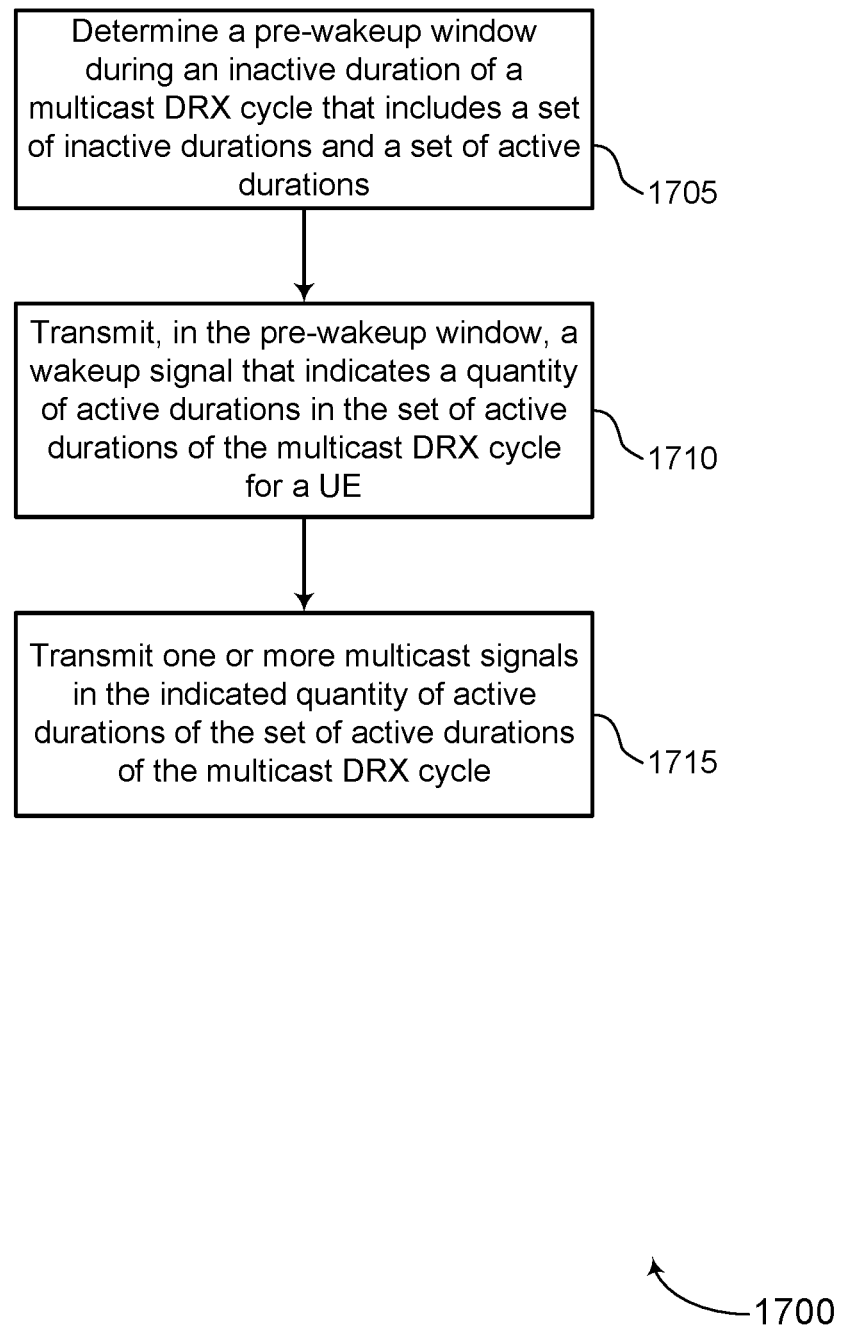

FIG. 17 shows a flowchart illustrating a method 1700 that supports wakeup signal for NR multicast communications in accordance with aspects of the present disclosure. The operations of method 1700 may be implemented by a base station 105 or its components. For example, the operations of method 1700 may be performed by a communications manager as described with reference to FIGS. 11-14. In some examples, a base station may execute a set of instructions to control the functional elements of the base station to perform the functions described below. Additionally or alternatively, a base station may perform aspects of the functions described below using special-purpose hardware.

At 1705, the base station may determine a pre-wakeup window during an inactive duration of a multicast DRX cycle that includes a set of inactive durations and a set of active durations. The operations of 1705 may be performed according to the methods described herein. In some examples, aspects of the operations of 1705 may be performed by a window component as described with reference to FIGS. 11-14.

At 1710, the base station may transmit, in the pre-wakeup window, a wakeup signal that indicates a quantity of active durations in the set of active durations of the multicast DRX cycle for a UE. The operations of 1710 may be performed according to the methods described herein. In some examples, aspects of the operations of 1710 may be performed by a signaling component as described with reference to FIGS. 11-14.

At 1715, the base station may transmit one or more multicast signals in the indicated quantity of active durations of the set of active durations of the multicast DRX cycle. The operations of 1715 may be performed according to the methods described herein. In some examples, aspects of the operations of 1715 may be performed by a signaling component as described with reference to FIGS. 11-14.

Figure 18:
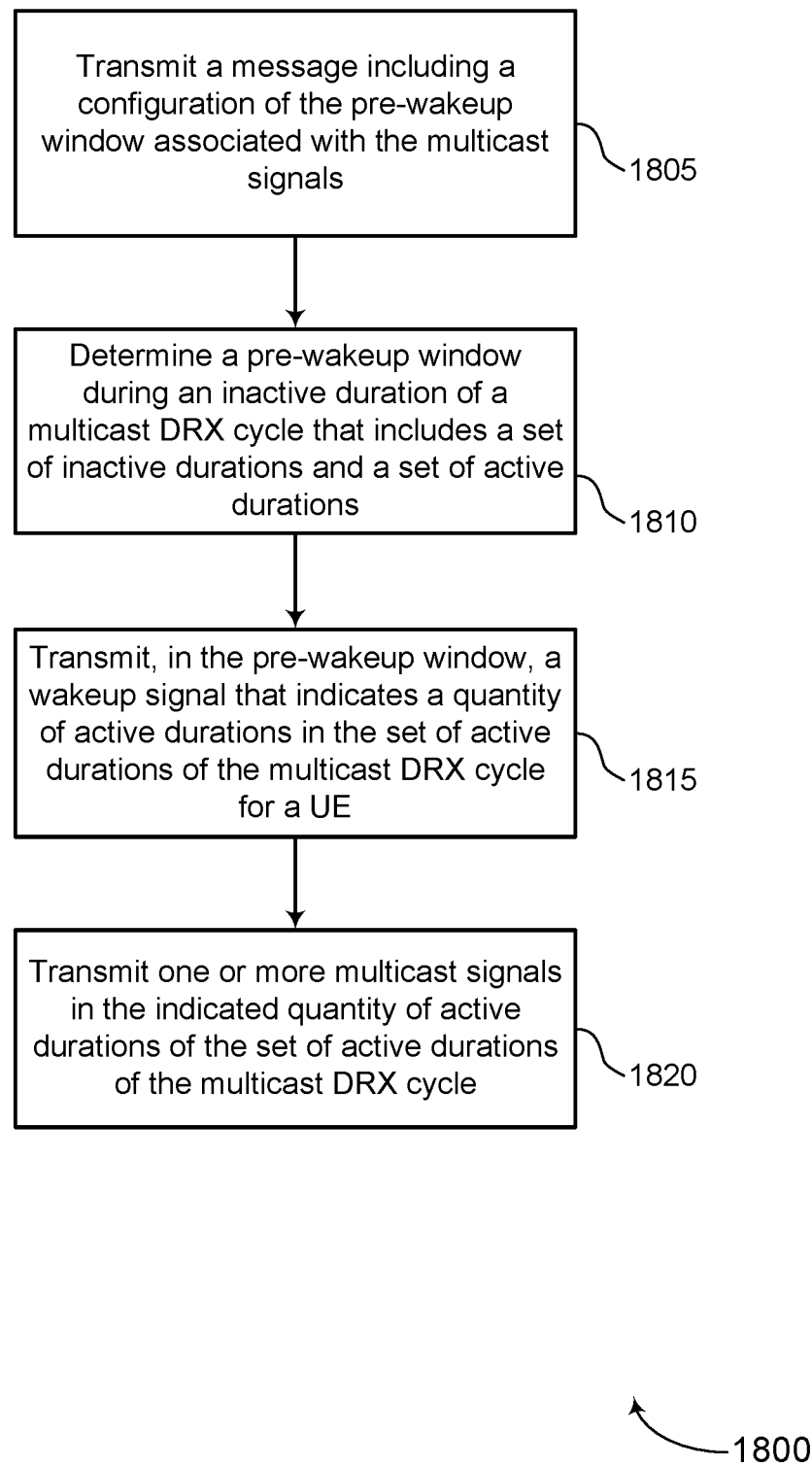

FIG. 18 shows a flowchart illustrating a method 1800 that supports wakeup signal for NR multicast communications in accordance with aspects of the present disclosure. The operations of method 1800 may be implemented by a base station 105 or its components. For example, the operations of method 1800 may be performed by a communications manager as described with reference to FIGS. 11-14. In some examples, a base station may execute a set of instructions to control the functional elements of the base station to perform the functions described below. Additionally or alternatively, a base station may perform aspects of the functions described below using special-purpose hardware.

At 1805, the base station may transmit a message including a configuration of the pre-wakeup window associated with the multicast signals. The operations of 1805 may be performed according to the methods described herein. In some examples, aspects of the operations of 1805 may be performed by a configuration component as described with reference to FIGS. 11-14.

At 1810, the base station may determine a pre-wakeup window during an inactive duration of a multicast DRX cycle that includes a set of inactive durations and a set of active durations. The operations of 1810 may be performed according to the methods described herein. In some examples, aspects of the operations of 1810 may be performed by a window component as described with reference to FIGS. 11-14.

At 1815, the base station may transmit, in the pre-wakeup window, a wakeup signal that indicates a quantity of active durations in the set of active durations of the multicast DRX cycle for a UE. The operations of 1815 may be performed according to the methods described herein. In some examples, aspects of the operations of 1815 may be performed by a signaling component as described with reference to FIGS. 11-14.

At 1820, the base station may transmit one or more multicast signals in the indicated quantity of active durations of the set of active durations of the multicast DRX cycle. The operations of 1820 may be performed according to the methods described herein. In some examples, aspects of the operations of 1820 may be performed by a signaling component as described with reference to FIGS. 11-14.

The methods described herein describe possible implementations, and that the operations and the steps may be rearranged or otherwise modified and that other implementations are possible. Further, aspects from two or more of the methods may be combined.

Aspect 1: A method for wireless communication at a user equipment (UE), comprising: monitoring a pre-wakeup window during an inactive duration of a multicast discontinuous reception cycle that includes a plurality of inactive durations and a plurality of active durations; receiving, in the pre-wakeup window, a wakeup signal that indicates a quantity of active durations in the plurality of active durations of the multicast discontinuous reception cycle for the UE; and monitoring the indicated quantity of active durations of the plurality of active durations for multicast signals for the UE during the multicast discontinuous reception cycle.

Aspect 2: The method of aspect 1, further comprising receiving a message comprising a configuration of the pre-wakeup window associated with the multicast signals, wherein monitoring the pre-wakeup window is based at least in part on the configuration.

Aspect 3: The method of aspect 2, wherein the configuration comprises a radio resource control configuration.

Aspect 4: The method of any one of aspects 1 through 3, wherein the plurality of active durations of the multicast discontinuous reception cycle is for a multicast service that corresponds to a group radio network temporary identifier.

Aspect 5: The method of any one of aspects 1 through 4, further comprising: monitoring a second pre-wakeup window during an inactive duration of a unicast discontinuous reception cycle that includes a set of inactive durations and a set of active durations; receiving, in the second pre-wakeup window, a second wakeup signal that indicates a quantity of active durations in the set of active durations of the unicast discontinuous reception cycle for the UE; and monitoring the indicated quantity of active durations of the set of active durations for unicast signals for the UE during unicast discontinuous reception cycle.

Aspect 6: The method of aspect 5, further comprising receiving a message comprising a configuration of the second pre-wakeup window associated with the unicast signals, wherein monitoring the second pre-wakeup window is based at least in part on the configuration.

Aspect 7: The method of aspect 6, wherein the configuration comprises a radio resource control configuration.

Aspect 8: The method of any one of aspects 5 through 7, wherein the plurality of active durations of the unicast discontinuous reception cycle is for a unicast service that corresponds to a radio network temporary identifier.

Aspect 9: The method of any one of aspects 5 through 8, wherein the pre-wakeup window comprises a multicast pre-wakeup window and the second pre-wakeup window comprises a unicast pre-wakeup window.

Aspect 10: The method of aspect 9, wherein the unicast pre-wakeup window is within a threshold number of symbols of the plurality of active durations of the multicast discontinuous reception cycle.

Aspect 11: The method of any one of aspects 9 through 10, wherein the unicast pre-wakeup window occurs within the plurality of active durations of the multicast discontinuous reception cycle.

Aspect 12: The method of any one of aspects 9 through 11, wherein the multicast pre-wakeup window is within a threshold number of symbols of the set of active durations of the unicast discontinuous reception cycle.

Aspect 13: The method of any one of aspects 9 through 12, wherein the multicast pre-wakeup window occurs within the set of active durations of the unicast discontinuous reception cycle.

Aspect 14: The method of any one of aspects 9 through 13, wherein the multicast pre-wakeup window at least partially overlaps the unicast pre-wakeup window.

Aspect 15: The method of aspect 14, further comprising receiving the wakeup signal over a portion of the multicast pre-wakeup window that overlaps the unicast pre-wakeup window, wherein the wakeup signal comprises an indication of the quantity of active durations of the plurality of active durations of the multicast discontinuous reception cycle and the quantity of active durations of the set of active durations of the unicast discontinuous reception cycle.

Aspect 16: A method for wireless communication at base station, comprising: determining a pre-wakeup window during an inactive duration of a multicast discontinuous reception cycle that includes a plurality of inactive durations and a plurality of active durations; transmitting, in the pre-wakeup window, a wakeup signal that indicates a quantity of active durations in the plurality of active durations of the multicast discontinuous reception cycle for a user equipment (UE); and transmitting one or more multicast signals in the indicated quantity of active durations of the plurality of active durations of the multicast discontinuous reception cycle.

Aspect 17: The method of aspect 16, further comprising transmitting a message comprising a configuration of the pre-wakeup window associated with the multicast signals, wherein monitoring the pre-wakeup window is based at least in part on the configuration.

Aspect 18: The method of any one of aspects 16 through 17, wherein the plurality of active durations of the multicast discontinuous reception cycle is for a multicast service that corresponds to a group radio network temporary identifier.

Aspect 19: The method of any one of aspects 16 through 18, further comprising: determining a second pre-wakeup window during an inactive duration of a unicast discontinuous reception cycle that includes a set of inactive durations and a set of active durations; transmitting, in the second pre-wakeup window, a second wakeup signal that indicates a quantity of active durations in the set of active durations of the unicast discontinuous reception cycle for the UE; and transmitting one or more unicast signals in the indicated quantity of active durations of the set of active durations of the unicast discontinuous reception cycle.

Aspect 20: The method of aspect 19, further comprising: transmitting a message comprising a configuration of the second pre-wakeup window associated with the unicast signals, wherein monitoring the second pre-wakeup window is based at least in part on the configuration.

Aspect 21: The method of any one of aspects 19 through 20, wherein the plurality of active durations of the unicast discontinuous reception cycle is for a unicast service that corresponds to a radio network temporary identifier.

Aspect 22: The method of any one of aspects 19 through 21, wherein the pre-wakeup window comprises a multicast pre-wakeup window and the second pre-wakeup window comprises a unicast pre-wakeup window.

Aspect 23: An apparatus for wireless communication at a user equipment (UE) comprising at least one means for performing a method of any one of aspects 1 through 15.

Aspect 24: An apparatus for wireless communication at a user equipment (UE) comprising a processor; memory coupled with the processor; and instructions stored in the memory and executable by the processor to cause the apparatus to perform a method of any one of aspects 1 through 15.

Aspect 25: A non-transitory computer-readable medium storing code for wireless communication at a user equipment (UE), the code comprising instructions executable by a processor to perform a method of any one of aspects 1 through 15.

Aspect 26: An apparatus for wireless communication at base station, comprising at least one means for performing a method of any one of aspects 16 through 22.

Aspect 27: An apparatus for wireless communication at base station comprising a processor; memory coupled with the processor; and instructions stored in the memory and executable by the processor to cause the apparatus to perform a method of any one of aspects 16 through 22.

Aspect 28: A non-transitory computer-readable medium storing code for wireless communication at base station, the code comprising instructions executable by a processor to perform a method of any one of aspects 16 through 22.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (for example, a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (such as, A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
    monitoring a pre-wakeup window associated with a plurality of multicast discontinuous reception cycles during an inactive duration of a multicast discontinuous reception cycle of the plurality, each multicast discontinuous reception cycle of the plurality including an inactive duration and an active duration;
    receiving, in the pre-wakeup window, a wakeup signal that indicates a quantity of multicast discontinuous reception cycles of the plurality for the UE; and
    monitoring for multicast signals for the UE during respective active durations of the indicated quantity of multicast discontinuous reception cycles.

2. The method of claim 1, further comprising receiving a message comprising a configuration of the pre-wakeup window associated with the multicast signals, wherein monitoring the pre-wakeup window is based at least in part on the configuration.

3. The method of claim 2, wherein the configuration comprises a radio resource control configuration.

4. The method of claim 1, wherein the respective active durations of the indicated quantity of multicast discontinuous reception cycles is for a multicast service that corresponds to a group radio network temporary identifier.

5. The method of claim 1, further comprising:
    monitoring a second pre-wakeup window associated with a set of unicast discontinuous reception cycles during an inactive duration of a unicast discontinuous reception cycle of the set, each unicast discontinuous reception cycle of the set including an inactive duration and an active duration;
    receiving, in the second pre-wakeup window, a second wakeup signal that indicates a quantity of unicast discontinuous reception cycles of the set for the UE; and
    monitoring for unicast signals for the UE during respective active durations of the indicated quantity of unicast discontinuous reception cycles.

6. The method of claim 5, further comprising receiving a message comprising a configuration of the second pre-wakeup window associated with the unicast signals, wherein monitoring the second pre-wakeup window is based at least in part on the configuration.

7. The method of claim 6, wherein the configuration comprises a radio resource control configuration.

8. The method of claim 5, wherein the respective active durations of the indicated quantity of unicast discontinuous reception cycles is for a unicast service that corresponds to a radio network temporary identifier.

9. The method of claim 5, wherein the pre-wakeup window comprises a multicast pre-wakeup window and the second pre-wakeup window comprises a unicast pre-wakeup window.

10. The method of claim 9, wherein the unicast pre-wakeup window is within a threshold number of symbols an active duration of the respective active durations of the indicated quantity of multicast discontinuous reception cycles.

11. The method of claim 9, wherein the unicast pre-wakeup window occurs within an active duration of the respective active durations of the indicated quantity of multicast discontinuous reception cycles.

12. The method of claim 9, wherein the multicast pre-wakeup window is within a threshold number of symbols of an active duration of the respective active durations of the indicated quantity of unicast discontinuous reception cycles.

13. The method of claim 9, wherein the multicast pre-wakeup window occurs within an active duration of the respective active durations of the indicated quantity of unicast discontinuous reception cycles.

14. The method of claim 9, wherein the multicast pre-wakeup window at least partially overlaps the unicast pre-wakeup window.

15. The method of claim 14, further comprising receiving the wakeup signal over a portion of the multicast pre-wakeup window that overlaps the unicast pre-wakeup window, wherein the wakeup signal comprises an indication of the quantity of multicast discontinuous reception cycles of the plurality and the quantity of unicast discontinuous reception cycles of the set.

16. A method for wireless communication at a network device, comprising:
    determining a pre-wakeup window associated with a plurality of multicast discontinuous reception cycles during an inactive duration of a multicast discontinuous reception cycle of the plurality, each multicast discontinuous reception cycle of the plurality including an inactive duration and an active duration;

transmitting, in the pre-wakeup window, a wakeup signal that indicates a quantity of multicast discontinuous reception cycles of the plurality for a user equipment (UE); and transmitting one or more multicast signals in respective active durations of the indicated quantity of multicast discontinuous reception cycles.

17. The method of claim 16, further comprising transmitting a message comprising a configuration of the pre-wakeup window associated with the one or more multicast signals, wherein determining the pre-wakeup window is based at least in part on the configuration.

18. The method of claim 16, wherein the respective active durations of the indicated quantity of multicast discontinuous reception cycles is for a multicast service that corresponds to a group radio network temporary identifier.

19. The method of claim 16, further comprising:

determining a second pre-wakeup window associated with a set of unicast discontinuous reception cycles during an inactive duration of a unicast discontinuous reception cycle of the set, each unicast discontinuous reception cycle of the set including an inactive duration and an active duration;

transmitting, in the second pre-wakeup window, a second wakeup signal that indicates a quantity of unicast discontinuous reception cycles of the set for the UE; and transmitting one or more unicast signals in respective active durations of the indicated quantity of unicast discontinuous reception cycles.

20. The method of claim 19, further comprising:

transmitting a message comprising a configuration of the second pre-wakeup window associated with the one or more unicast signals, wherein determining the second pre-wakeup window is based at least in part on the configuration.

21. The method of claim 19, wherein the respective active durations of the indicated quantity of unicast discontinuous reception cycles is for a unicast service that corresponds to a radio network temporary identifier.

22. The method of claim 19, wherein the pre-wakeup window comprises a multicast pre-wakeup window and the second pre-wakeup window comprises a unicast pre-wakeup window.

23. An apparatus for wireless communication, comprising:

a processor; and memory coupled with the processor and storing instructions executable by the processor to cause the apparatus to:

monitor a pre-wakeup window associated with a plurality of multicast discontinuous reception cycles during an inactive duration of a multicast discontinuous reception cycle of the plurality, each multicast discontinuous reception cycle of the plurality including an inactive duration and an active duration;

receive, in the pre-wakeup window, a wakeup signal that indicates a quantity of multicast discontinuous reception cycles of the plurality for the apparatus; and monitor for multicast signals for the apparatus during respective active durations of the indicated quantity of multicast discontinuous reception cycles.

24. The apparatus of claim 23, wherein the instructions are further executable by the processor to cause the apparatus to receive a message comprising a configuration of the pre-wakeup window associated with the multicast signals, wherein monitoring the pre-wakeup window is based at least in part on the configuration.

25. The apparatus of claim 24, wherein the configuration comprises a radio resource control configuration.

26. The apparatus of claim 23, wherein the respective active durations of the indicated quantity of multicast discontinuous reception cycles is for a multicast service that corresponds to a group radio network temporary identifier.

27. The apparatus of claim 23, wherein the instructions are further executable by the processor to cause the apparatus to:

monitor a second pre-wakeup window associated with a set of unicast discontinuous reception cycles during an inactive duration of a unicast discontinuous reception cycle of the set, each unicast discontinuous reception cycle of the set including an inactive duration and an active duration;

receive, in the second pre-wakeup window, a second wakeup signal that indicates a quantity of unicast discontinuous reception cycles of the plurality for the apparatus; and monitor for unicast signals for the apparatus during respective active durations of the indicated quantity of unicast discontinuous reception cycles.

28. The apparatus of claim 27, wherein the instructions are further executable by the processor to cause the apparatus to receive a message comprising a configuration of the second pre-wakeup window associated with the unicast signals, wherein monitoring the second pre-wakeup window is based at least in part on the configuration.

29. The apparatus of claim 28, wherein the configuration comprises a radio resource control configuration.

30. An apparatus for wireless communication, comprising:

a processor; and memory coupled with the processor and storing instructions executable by the processor to cause the apparatus to:

determine a pre-wakeup window associated with a plurality of multicast discontinuous reception cycles during an inactive duration of a multicast discontinuous reception cycle of the plurality, each multicast discontinuous reception cycle of the plurality including an inactive duration and an active duration;

transmit, in the pre-wakeup window, a wakeup signal that indicates a quantity of multicast discontinuous reception cycles of the plurality for a user equipment (UE); and transmit one or more multicast signals in respective active durations of the indicated quantity of multicast discontinuous reception cycles.

* * * * *